(12) United States Patent
Bai et al.

(10) Patent No.: US 9,505,412 B2
(45) Date of Patent: Nov. 29, 2016

(54) SYSTEM AND METHOD FOR DETECTION AND UTILIZATION OF DRIVER DISTRACTION LEVEL

(71) Applicant: Honda Motor Co., Ltd., Tokyo (JP)

(72) Inventors: Sue Bai, Novi, MI (US); Radovan Miucic, Southfield, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/566,562

(22) Filed: Dec. 10, 2014

(65) Prior Publication Data

US 2015/0091740 A1 Apr. 2, 2015

Related U.S. Application Data

(63) Continuation-in-part of application No. 14/450,097, filed on Aug. 1, 2014.

(60) Provisional application No. 61/861,886, filed on Aug. 2, 2013.

(51) Int. Cl.
| | |
|---|---|
| *G08G 1/00* | (2006.01) |
| *B60W 40/08* | (2012.01) |
| *G08G 1/005* | (2006.01) |
| *G08B 21/06* | (2006.01) |
| *B60Q 1/52* | (2006.01) |
| *B60Q 9/00* | (2006.01) |

(52) U.S. Cl.
CPC ............. *B60W 40/08* (2013.01); *B60Q 1/525* (2013.01); *B60Q 9/008* (2013.01); *G08B 21/06* (2013.01); *G08G 1/005* (2013.01)

(58) Field of Classification Search
CPC ............... B60W 40/09; B60W 50/08; B60W 2040/0818; B60W 2540/00; B60W 40/08; G08B 21/06; G08G 1/005
USPC ........................................................ 340/901
See application file for complete search history.

(56) References Cited

U.S. PATENT DOCUMENTS

| | | | |
|---|---|---|---|
| 6,218,947 B1 * | 4/2001 | Sutherland ............. | G08B 21/06 180/272 |
| 6,337,637 B1 | 1/2002 | Kubota et al. | |
| 7,095,336 B2 | 8/2006 | Rodgers et al. | |
| 7,202,776 B2 | 4/2007 | Breed | |
| 7,271,736 B2 | 9/2007 | Siegel et al. | |
| 7,576,639 B2 | 8/2009 | Boyles et al. | |
| 7,629,899 B2 | 12/2009 | Breed | |
| 7,630,806 B2 | 12/2009 | Breed | |
| 7,852,462 B2 | 12/2010 | Breed et al. | |

(Continued)

FOREIGN PATENT DOCUMENTS

| | | |
|---|---|---|
| EP | 2511121 A1 | 10/2012 |
| WO | 2014011556 A1 | 1/2014 |

*Primary Examiner* — Naomi Small
(74) *Attorney, Agent, or Firm* — Arent Fox LLP

(57) ABSTRACT

A system includes a primary vehicle operable by a driver. The driver is associated with a first device having a plurality of features with which the driver may interact. The system further includes a second device integral with the primary vehicle and in communication with the first device. The second device is configured to detect an interaction between the driver and at least one of the features of the first device, and calculate a driver distraction level based upon the interaction between the driver and the at least one feature of the first device.

20 Claims, 15 Drawing Sheets

(56) References Cited

U.S. PATENT DOCUMENTS

| | | |
|---|---|---|
| 8,093,999 B2 | 1/2012 | Bauer et al. |
| 8,164,432 B2 | 4/2012 | Broggi et al. |
| 8,195,394 B1 | 6/2012 | Zhu et al. |
| 8,253,589 B2 | 8/2012 | Grimm et al. |
| 8,340,894 B2 | 12/2012 | Yester |
| 8,547,249 B2 | 10/2013 | David et al. |
| 8,594,370 B2 | 11/2013 | Schamp et al. |
| 2005/0149251 A1 | 7/2005 | Donath et al. |
| 2005/0194777 A1* | 9/2005 | Manwaring ............ B62D 1/192 280/777 |
| 2006/0015219 A1* | 1/2006 | Kynast .................. G01C 21/26 701/1 |
| 2008/0231703 A1* | 9/2008 | Nagata .................. H04N 7/181 348/148 |
| 2009/0018711 A1 | 1/2009 | Ueda et al. |
| 2010/0102972 A1* | 4/2010 | Middlekauff ........ B60K 28/066 340/576 |
| 2011/0090093 A1* | 4/2011 | Grimm ................. G01S 5/0072 340/901 |
| 2011/0106376 A1* | 5/2011 | Tijerina ................... B60Q 1/40 701/36 |
| 2011/0140968 A1* | 6/2011 | Bai ....................... G01S 5/0072 342/454 |
| 2011/0199199 A1* | 8/2011 | Perkins .................. B60Q 1/506 340/435 |
| 2011/0301802 A1* | 12/2011 | Rupp ................... G08G 1/0112 701/408 |
| 2012/0008129 A1 | 1/2012 | Lu et al. |
| 2012/0025964 A1 | 2/2012 | Beggs et al. |
| 2012/0095646 A1* | 4/2012 | Ghazarian ............... G01S 19/17 701/36 |
| 2013/0029650 A1* | 1/2013 | Xiao ..................... H04W 4/027 455/417 |
| 2013/0187792 A1* | 7/2013 | Egly .................... G08G 1/0965 340/901 |
| 2014/0051346 A1* | 2/2014 | Li ......................... H04H 20/59 455/3.01 |
| 2014/0081521 A1* | 3/2014 | Frojdh ............. H04N 21/42201 701/36 |
| 2014/0125474 A1* | 5/2014 | Gunaratne ............. G08G 1/163 340/439 |
| 2014/0142798 A1* | 5/2014 | Guarnizo Martinez ............... B60W 30/09 701/23 |
| 2015/0005981 A1* | 1/2015 | Grimm .................. G07C 5/008 701/1 |

* cited by examiner

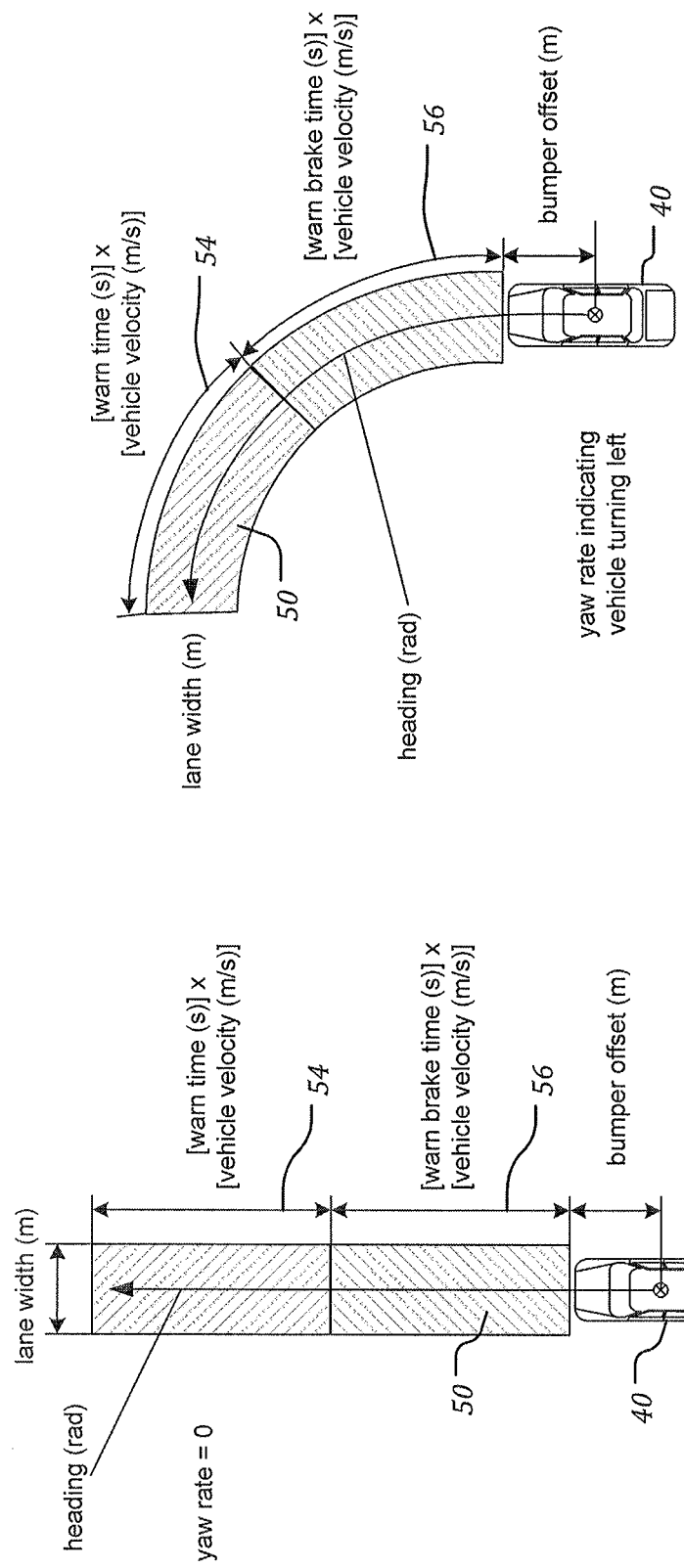

SYSTEM AND METHOD FOR DETECTION AND UTILIZATION OF DRIVER DISTRACTION LEVEL

CROSS-REFERENCE TO RELATED APPLICATIONS

This application is a continuation-in-part of U.S. patent application Ser. No. 14/450,097, filed on Aug. 1, 2014, which in turn claims priority to U.S. Provisional Patent Application No. 61/861,886, filed on Aug. 2, 2013, the entirety of which are incorporated herein by reference.

BACKGROUND OF THE INVENTION

Wireless technology has the potential to enable vehicles to communicate with each other and with the infrastructure around them. Connected vehicle technology—Vehicle to Vehicle (V2V) and Vehicle to Infrastructure (V2I)—could one day alert motorists of dangerous roadway conditions, impending collisions, or dangerous curves. Connected vehicles could also "talk" to traffic signals, work zones, toll booths, school zones, and other types of infrastructure.

Connected vehicle systems are based on Dedicated Short Range Communications (DSRC)—a technology similar to Wi-Fi—which is fast, secure, reliable, and unlikely to be vulnerable to interference. Using either in-vehicle or aftermarket devices that continuously share important safety and mobility information, vehicles ranging from cars to trucks and buses to trains would be able to "talk" to each other and to different types of roadway infrastructure.

Analyses by the U.S. Department of Transportation's National Highway Traffic Safety Administration (NHTSA) show connected vehicle technology could potentially address approximately 80 percent of the crash scenarios involving non-impaired drivers. Specifically, NHTSA research shows that this technology could help prevent the majority of types of crashes that typically occur in the real world, such as crashes at intersections or while changing lanes.

The NHTSA announced a decision in February of 2014 to begin taking steps to enable V2V communication technology for light vehicles indicating that the NHTSA may move forward with rulemaking that would require future vehicles to support V2V and V2I data communications for safety applications. Connected V2V and V2I safety applications heavily rely on the Basic Safety Message (BSM), which is one of the messages defined in the Society of Automotive standard J2735, DSRC Message Set Dictionary, November 2009. The BSM is broadcast from vehicles over the 5.9 GHz DSRC band. Transmission range is on the order of 1,000 meters. The BSM consists of two parts (Table 1). BSM Part 1 contains core data elements, including vehicle position, heading, speed, acceleration, steering wheel angle, and vehicle size and is transmitted at an adjustable rate of about 10 times per second. BSM Part 2 contains a variable set of data elements drawn from an extensive list of optional elements. They are selected based on event triggers (e.g., ABS activated) and are added to Part 1 and sent as part of the BSM message, but are transmitted less frequently in order to conserve bandwidth. The BSM message includes only current snapshots (with the exception of path data which is itself limited to a few second's worth of past history data).

TABLE 1

Constituents of BSM Parts 1 and 2

| BSM Part 1 | BSM Part 2 |
|---|---|
| Position (local 3D): | Road coefficient of friction |
| Latitude | Rain sensor/precipitation sensor |
| Longitude | Traction Control System active over 100 msec |
| Elevation | Antilock Brake System active over 100 msec |
| Positional accuracy | Lights changed and Exterior lights (status) |
| Motion: | Wipers changed and wiper status |
| Transmission state | Ambient air temperature |
| speed | Ambient air pressure |
| heading | Vehicle type (currently only for fleet vehicles) |
| Steering wheel angle | |
| Acceleration Set (4-way): this includes 3 axes of acceleration plus yaw rate | |
| Vehicle Size | |

Although connected V2V and V2I safety applications have the potential to improve inter-vehicle communication, these applications do not address broader scenarios—specifically, Vehicle to Pedestrian (V2P) communication.

SUMMARY OF THE INVENTION

In one embodiment, the present disclosure provides a system including a primary vehicle operable by a driver. The driver is associated with a first device having a plurality of features with which the driver may interact. The system further includes a second device integral with the primary vehicle and in communication with the first device. The second device is configured to detect an interaction between the driver and at least one of the features of the first device, and calculate a driver distraction level based upon the interaction between the driver and the at least one feature of the first device.

In another embodiment, the present disclosure provides method, including detecting a first device having a plurality of features with which a driver of a primary vehicle may interact. The method further includes monitoring with a second device an interaction between the driver and at least one of the features of the first device, and calculating a driver distraction level based upon the interaction between the driver and the at least one feature of the first device.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 9 is a schematic illustration of a vehicle path prediction algorithm for a vehicle with a zero yaw rate indicative of a straight path of travel.

FIG. 10 is a schematic illustration of a vehicle path prediction algorithm for a vehicle with a positive yaw rate indicative of a turning maneuver.

Like reference numerals will be used to refer to like parts from figure to figure in the following detailed description.

DETAILED DESCRIPTION OF THE INVENTION

Figure 1:
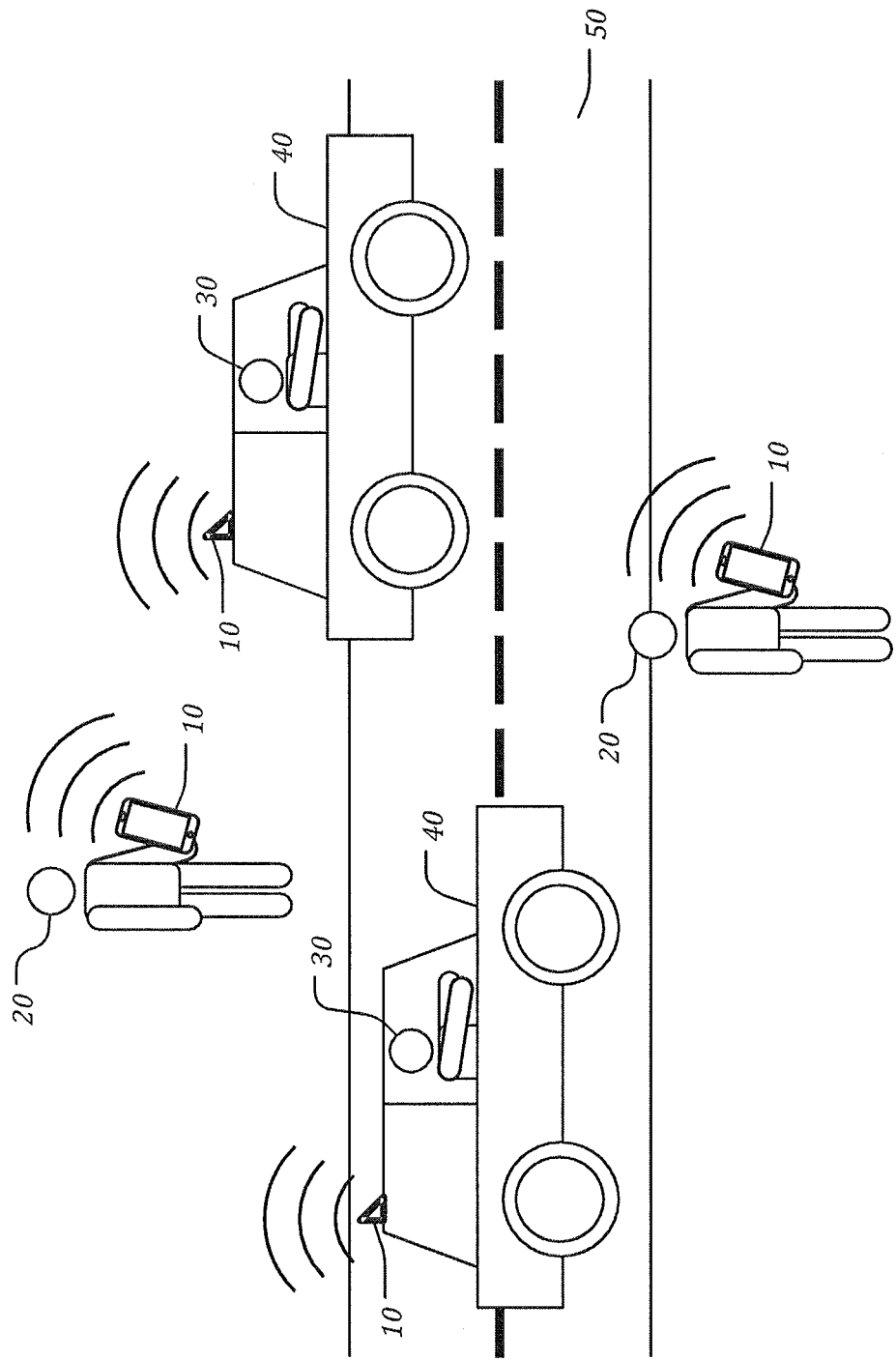
FIG. 1 is a schematic illustration of some of the components of the V2P communications system.

Although connected V2V and V2I safety applications have the potential to improve inter-vehicle communication, these applications do not address broader scenarios—specifically, V2P communication.

The present V2P communication system and method broadly address a variety of scenarios where a driver of a vehicle may come into contact with a pedestrian. In the present disclosure, a pedestrian is defined as any road user or any person in the vicinity of a road, highway, parking lot or other thoroughfare on which a vehicle may travel. In one aspect, a pedestrian may be a person on foot and in another aspect, a pedestrian may be an operator of a pedestrian transportation means such as a bicycle, unicycle, powered or unpowered wheelchair, Segway®, scooter, moped, or another similar motorized or non-motorized transportation means.

One or more algorithms may be used to distinguish among walking pedestrians, wheelchair riders, bicycle riders, Segway® riders, and the like. In one example, a device carried by a user may include a button or other interface to allow the user to indicate their status. Accordingly, a user may indicate that they are a pedestrian, on a bicycle, on a scooter and so forth. In another aspect, blind or deaf users may interface with a device to select from options such as "disability: hearing", "disability: vision", and the like. A user may manually enter a status or select from a list of predetermined options.

In another example, a device may automatically detect and/or classify the user. One method for automatic detection/classification includes identifying factors such as the kinematic behavior of the user. In one aspect, a pedestrian may have an average speed for walking of about 1-2 meter per second. Moreover, the gait or cadence of the pedestrian may be characterized by a vertical acceleration in addition to horizontal movement. In another aspect, a manual wheelchair user may have an average wheelchair speed of about 0.3 meters per second, which may be less than a pedestrian. A wheelchair user may not exhibit vertical motion. Furthermore, if a wheelchair is propelled with the hands of a user of the wheelchair (i.e., self-propelled), the intermittent turning of the wheels of the wheelchair by the user may result in speed fluctuations or pulses as opposed to the more constant speed of a pedestrian. In a yet another aspect, a powered wheelchair may have an average speed of about 0.4 meters per sec with relatively constant horizontal movement. In a further aspect, a scooter or Segway® may have an average speed of about 5-8 meters per second, with top speeds of up to or exceeding 12 meters per second. While the scooter or Segway® may behave similarly to a powered wheelchair, with relatively little to no vertical motion and a relatively constant speed, the scooter or Segway® may be differentiated from the relatively slower electrical wheelchair.

The V2P communication system and method may rely on any suitable communication medium, technology or combination thereof. In one aspect, the system may include a vehicle with at least one of a factory installed device and an aftermarket device that is integrated with the vehicle. In another aspect, the system may include a mobile device such as a smart phone, personal Global Positioning System (GPS), or a dedicated device designed explicitly for the V2P communication system. The aforementioned devices and vehicles may be operated by and/or associated with the driver of a vehicle or a pedestrian, such as a pedestrian on foot or a pedestrian in operation of a vehicle such as a one of the aforementioned pedestrian transportation means. The devices may also be referred to as V2P enabled devices. In the case of a particular example device, communication may be achieved through Wi-Fi at a frequency of 5.8 GHz or 2.4 GHz. Alternatively, communication may be carried out over DSRC at a frequency of 5.9 GHz in the United States, or at a frequency of 5.8 GHz in Europe and Japan.

In one aspect, a user of a device may or may not be able to modify the ability of a V2P device to broadcast a BSM. A V2P device may be programmed by a manufacture or vendor of the device to broadcast a BSM at a predetermined rate or under predetermined conditions. In one example, a V2P device may be programmed to broadcast a BSM every second or every 0.1 seconds. In another example, a V2P device may be programmed to determine the context of the device (e.g., indoors vs. outside) and only broadcast when a particular context is detected.

In one aspect, the device includes GPS positioning capability so that a position of a device (e.g., latitude, longitude, elevation) may be communicated to the receiving side such as a vehicle. In another aspect, the minimum processing power of a device may vary depending on the implementation of the present system and method. For example, a portion of the computation processing may be carried out on a device carried by a pedestrian or other user. The computation may include verification of incoming messages from vehicles, determination of potential threats and generation of alerts to warn the user of the device accordingly. Verification may include one or more safeguards to prevent or identify false reporting (e.g., a pedestrian on a bus) or to verify the authenticity of a message to prevent tampering with messages or the broadcasting of malevolent messages. Moreover, verification may be achieved by verifying each message's authenticity, every other messages authenticity, or every tenth message's authenticity (e.g., 10% random sampling). In one aspect, computation power requirements may be reduced by about 90% for a 10% sampling rate. Reducing processing power, or the energy used by a V2P device in general, may be useful in the case of a battery-powered device.

Communications sent and received by the V2P system include, but are not limited to BSMs. BSMs, as described above, may include one or more of the elements listed in Table 1 as well as additional elements not listed. Some of the elements that are not listed will be described herein, while still others are anticipated and will become apparent given the various embodiments of the V2P system.

In one embodiment, the V2P communication system and method may facilitate pedestrian classification. A driver of a vehicle may encounter a pedestrian with a disability, such as a pedestrian with impaired hearing or vision. Alternatively, the pedestrian may be a child or inebriated. The V2P communication system and method may identify information about the pedestrian and alert either or both of the driver and the pedestrian of the presence of the other. Moreover, the information gathered may be used to classify the pedestrian in order to tailor the alert that the driver and/or pedestrian receives.

In another embodiment, the V2P communication system and method may be used to detect a distracted driver or pedestrian and provide information such as an alert to the driver or pedestrian or both based on a given scenario. In one aspect, a distracted driver and/or pedestrian may be identified based on a detected behavior of the driver and/or pedestrian. In one aspect, the detecting device may include any of the aforementioned devices suitable in the implementation of the V2P system.

In yet another embodiment, the V2P communication system and method may be applied to detect a driver-pedestrian transition or a pedestrian cross-street intention. One algorithm for detecting a vehicle driver to pedestrian transition may include detection of the deactivation of a Bluetooth hands-free link, detection of removal of a key from the vehicle ignition, detection of the vehicle engine being turned off, or the transition of a portable device (e.g., a smart phone) from a vehicle state to a pedestrian state. In the case of the latter example, a device may be characterized by constant movement during transport in the vehicle, whereas the device may be characterized by abrupt or short movements as the device is moved from the interior of the vehicle to a location exterior to the vehicle, thereby transitioning to a portable device carried by the user (i.e., pedestrian). This abrupt and short movement may be detected by an accelerometer included in the device. Moreover, movement detection may be combined with vehicle door open and close signals, or other data acquired by the vehicle or the device in order to confirm that the device is now outside the vehicle after the driver leave the vehicle.

In one aspect, the system may detect the act (or intention) of a pedestrian entering or exiting a vehicle and provide a corresponding alert. In an exiting scenario, an alert may indicate that a pedestrian may be entering the vicinity. Conversely, in an entering scenario, an alert may indicate that a vehicle may be entering the vicinity. Furthermore, the information broadcast by the V2P system may be the result of the intention of exiting or entering a vehicle. Given the location of the user of the system relative to the vehicle, a customized alert may be generated such as an indication of the possibility of a user crossing a roadway in order to enter the vehicle.

In still another embodiment, the V2P communication system and method may be applied to predict a pedestrian trajectory. In one aspect, the system uses information provided by a device associated with the pedestrian in order to estimate a future position of the pedestrian based on history of the pedestrian, such as historical location data. Example information may include a pedestrian's every day walking path history to determine the mostly likely location of a future street crossing location and pattern. Alternative (or additional) information may include use of map data that lists street crossing, curb, or paint location information. This map data may be combined with a pedestrian's current movement to predict a crossing location and direction.

A communication system and method are provided that enable V2P communication. The V2P communication system and method broadly address a variety of scenarios where a driver of a vehicle may cross paths with a pedestrian and vice versa. Referring to FIG. 1, a pedestrian 20 may be associated with a V2P enabled device 10. In addition, a vehicle 40 with a driver 30 is shown. The driver 30 travels on a roadway 50 near the pedestrian 20. The vehicle 40 may also be associated with a V2P enabled device 10. The V2P enabled devices 10 are in communication with one another using, for example, DSRC.

Pedestrian Classification

Figure 2:
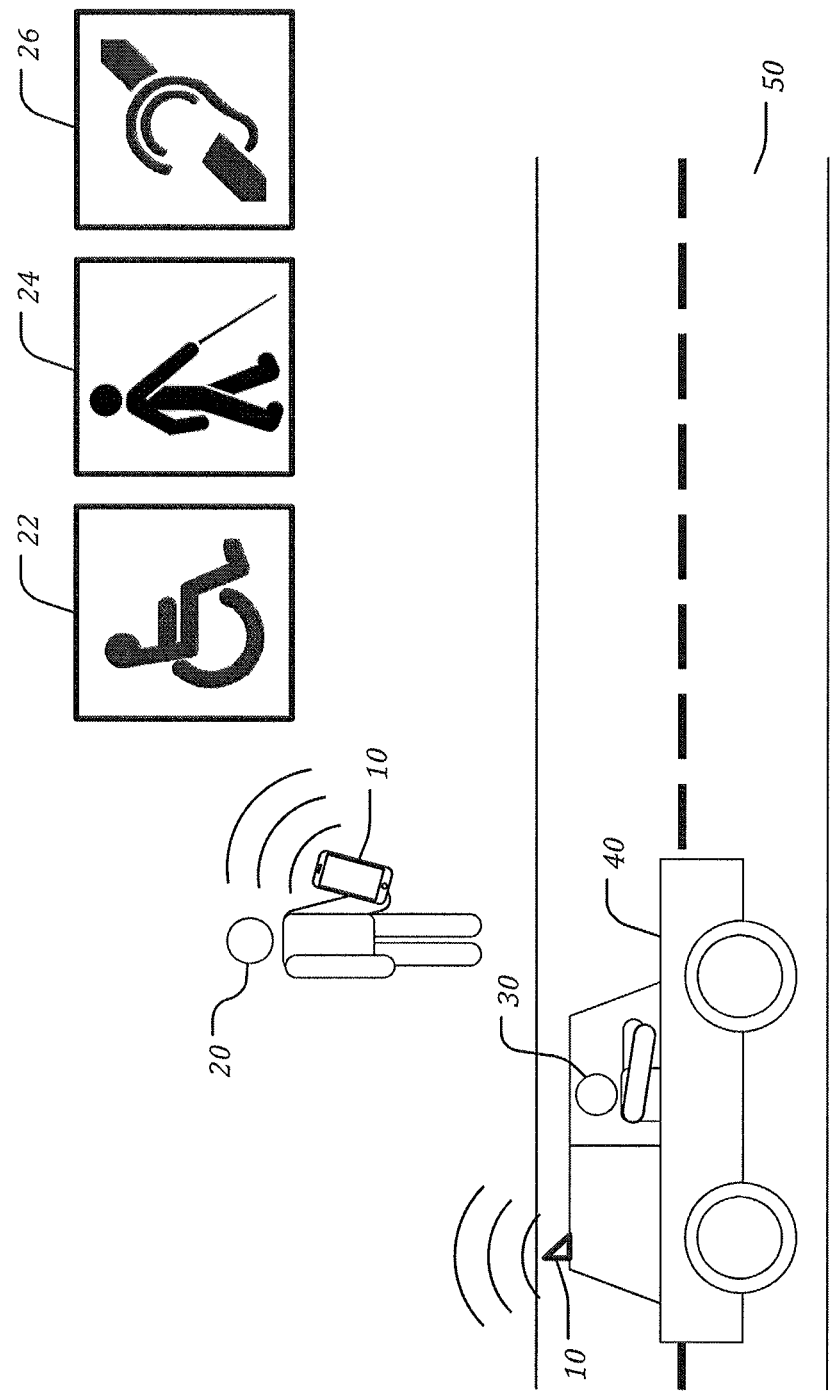
FIG. 2 is a schematic illustration of a method of pedestrian classification using the V2P system.

In one aspect, the V2P communication system and methods encompass pedestrian classification (FIG. 2). The V2P system may be capable of classifying a given pedestrian 20 as, for example, a wheelchair user 22, a blind person 24 or deaf person 26, or a regular pedestrian without disability. This classification may impact the behavior of the driver 30. Alternatively, the V2P system may control the vehicle 40 to automatically react such as through the use of an audible signal exterior to the vehicle, through the use of flashing the vehicles lights, or by engaging the braking system.

Once the device 10 carried by the pedestrian 20 detects the type and the disability classification of the user of the device 10, the device 10 may incorporate the classification information into the broadcasting of a safety message. A vehicle 40 may receive these messages and determine that the pedestrian 20 may, for example, have impaired vision. Thereafter, the vehicle 40 may actuate an audible warning such as vehicle horn to warn the pedestrian 20. If the pedestrian 20 is a wheelchair user, the vehicle 40 may actuate a brake of the vehicle 40. Accordingly, the approach of the vehicle 40 towards the pedestrian 20 in the wheelchair may be slowed to provide the wheelchair user with a greater amount of clearance or time to complete a street crossing maneuver. In one aspect, the clearance may enable the wheelchair user to feel less vulnerable as compared to a pedestrian 20 that does not require a wheelchair.

A V2P information conveyance device, such as an alert system, may accurately assess the alert timing and alert interface based on knowledge of the specific needs from a pedestrian, such as whether a disabled pedestrian requires additional street-crossing time or where the likely crossing location is—(e.g., where the road curb is graded properly for wheelchair travel).

In one implementation, for the BSM-capable mobile device users with special needs/disabilities, the device may add their special needs information as part of the BSM transmission. In that case, the user may use a setup interface provided by the mobile device to enter information describing their disabilities or special needs. In the case of a wheelchair user, for example, safety algorithms may be running on the vehicle as well as in the wheelchair user's mobile device. For example, for a wheelchair user with BSM capability in his or her mobile device, the wheelchair user's mobile device (e.g., a mobile phone or other devices capable of processing and transceiving safety messages) transmits awareness messages similar to the BSM, with additional information such as the classification of the user (e.g., physically handicapped), the classification of the pedestrians transportation means (e.g., a wheelchair) and other information, to help the vehicles and other drivers and pedestrians to identify the movement characteristics of the wheelchair user in order to perform collision threat assessment.

Other information that may be transmitted in addition to or in place of a BSM may include whether the user is listening to music, texting, talking on the phone, or browsing the internet. The vehicle, upon receiving the information transmitted by the device, may determine the probability of the pedestrian being distracted. If the vehicle determines that the probability of distraction may be likely, then the vehicle may warn the pedestrian. Example warnings may include an audible or visual alert. Moreover, the vehicle may actuate the brakes or alert the driver that a greater stopping distance may be required to account for the distracted pedestrian. By comparison, the device may warn the pedestrian by providing an audible or visual alert, by interrupting or deactivating programs with which the user may be interfacing, or the like.

In one example involving a wheelchair user, the vehicle may use the BSMs received from the wheelchair user, analyze data such as lateral acceleration, longitudinal acceleration, vertical acceleration, speed, heading, yaw rate and other parameters. Furthermore, the vehicle may detect a distinctive movement pattern of the user of the device, or further classify the mobile device user as a wheelchair user. In yet another aspect, the vehicle may use this analysis, combined with the mobile device's additional user information, to confirm the wheelchair user classification. The mobile device and any systems associated with the vehicle may also use the wheelchair use information to further determine the wheelchair user's potential road crossing location, which may be restricted to the crosswalk curbs that are properly graded for wheelchair access.

In one aspect, a cooperative safety application running in the vehicle calculates the threat of potential collision with the wheelchair user. If the probability of a collision is low, the vehicle informs the driver that the wheelchair user may be present. If the probability becomes high, the vehicle warns the driver more aggressively. The probability may be calculated based on factors including the distance to collision and the time to collision. While varied algorithms may be used to calculate a probability, one example includes the use of a bounding box having multiple alert zones (see, e.g., FIG. 6). In another aspect, a similar safety application may running on the wheelchair user's mobile device, and warns the wheelchair user of whether the possibility of collision may be high. Warnings are more aggressive in the case of a wheelchair user with potentially slower movement. For example, a wheelchair user may take a longer time to cross a street compared to a non-wheelchair user. The vehicle may take into account this information while determining the warning timing, and/or extend the waiting time for the wheelchair user (or other user having a condition resulting in a lower than expected speed when crossing the street) to complete the street crossing maneuver.

In another example involving a visually impaired pedestrian, in a manner similar to the wheelchair user, the visually impaired pedestrian may be detected by their special movement pattern such as the use of a guide cane that results in a characteristic audible pattern that may be detected by a device associated with the pedestrian and be transmitted as part of the BSM from the device. Similarly, a hearing impaired pedestrian may set their V2P device to, for example, a high-vibration mode or any other suitable settings for one with a hearing impairment. Again, once the V2P device makes the determination that the pedestrian may be visually impaired, messages notifying nearby vehicles of the condition of the pedestrian may be broadcast.

Classification aspects of the V2P systems and methods may also extend to the classification of children and adults. Safety algorithms may be implemented on V2P devices associated with either or both of the driver and the pedestrian. In one example, a cooperative safety application running on a device associated with a vehicle calculates the threat of potential collision with the pedestrian. If a child or similar person is detected, the vehicle informs the driver that children are present. A similar safety application may be implemented on a device associated with the child pedestrian that warns the pedestrian if there is a driver/vehicle approaching. Warnings may be tailored for children such that they are more aggressive (e.g., louder, longer), for example.

In one example, the V2P system may detect if a child or adult is carrying a V2P device by employing one or more methods. Methods may include the use of parental controls where a parent configures settings on the device associated with the child pedestrian indicating that a child is carrying the device. Alternatively, the device may use smart context sensing, including i) the use of a precise elevation threshold obtained from a GPS receiver in the device; ii) movement pattern matching (i.e., a child's movement pattern will differ from an adult's); and iii) the device (or system in communication with the device) automatically calculating the probability that a child is carrying the device based on usage factors.

Example usage factors for characterizing a user as a child may include identification of a gait, stride or cadence as the movement pattern of a child may be characterized by smaller steps or smaller horizontal movement per step as compared with an average adult. An algorithm may additionally (or alternatively) include time of day and the location information which may correspond with a school zone or the likelihood that a child is traveling to or from school. In the case of a child using a V2P smart phone, usage factors may include the browsing history, use of services such as social media and e-mail, and the type of music being played. Such factors may be analyzed, for example, with profiling algorithms to determine whether the user is a child. In a specific example, if children songs are being played on the device, an algorithm may determine that the device is currently associated with a child.

Figure 3:
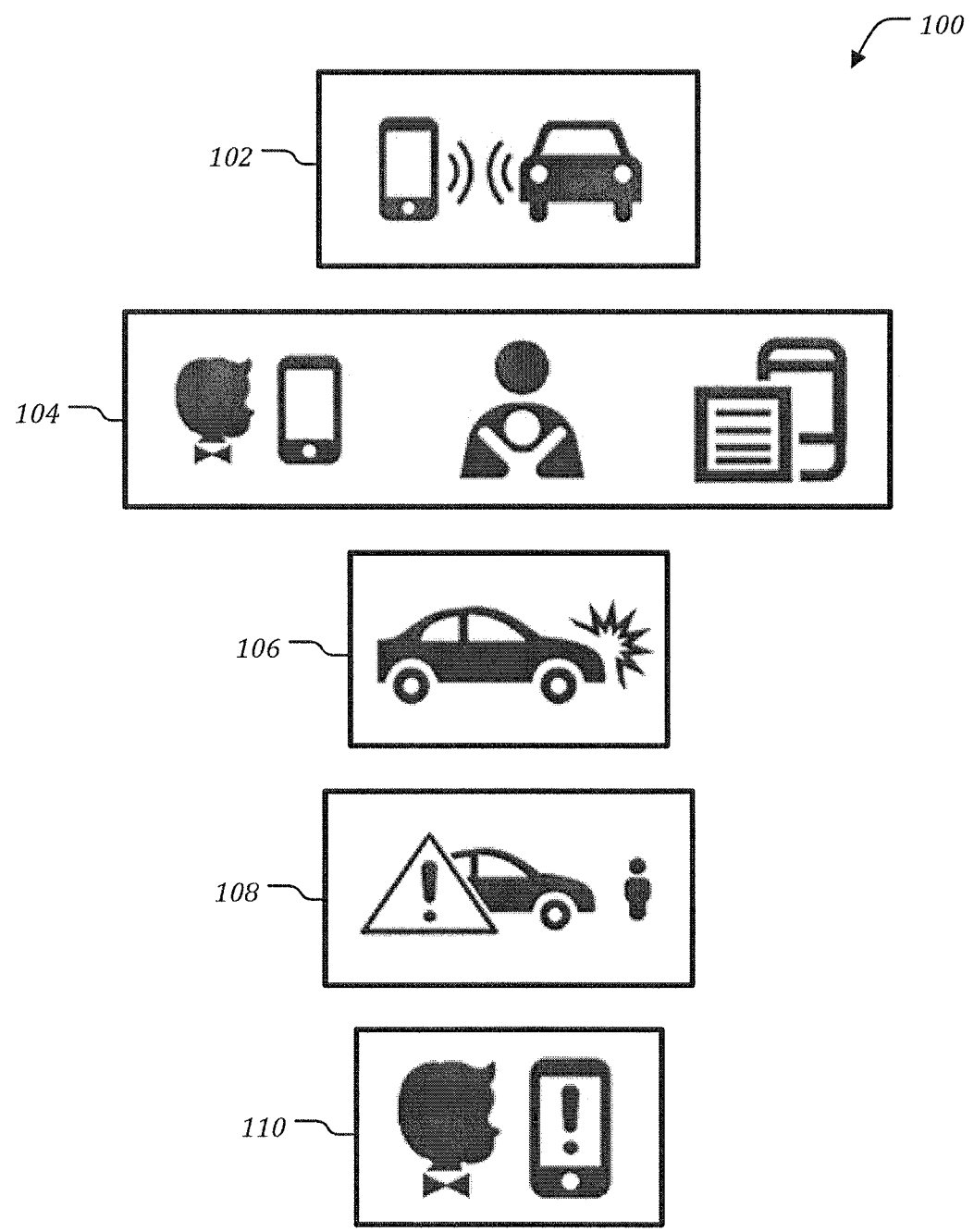
FIG. 3 shows an example method for classification of a pedestrian as a child and a potential outcome of the classification.

Referring to FIG. 3, a method 100 is illustrated. In 102, a device such as a smart phone and a device associated with a vehicles periodically (or frequently) transmit awareness messages. In 104, an awareness message coming form the smart phone contains information that a child is carrying the smart phone device. This indication may be determined through the analysis of the status of parental controls on the smart phone or through precise elevation threshold data from a GPS receiver in the smart phone. In 106, a cooperative safety application running on the vehicle calculates the threat of potential collision. If a high probability of collision is calculated, the vehicle warns the driver. Then, in 108, a supporting application on the smart phone provides the pedestrian with an indication of whether the pedestrian is in a child friendly surrounding, whether there are nearby cars, and warnings of any potential collisions. Finally, in 110, if a potential collision is detected, warnings provided by the device are more aggressive and in advance in the case of children pedestrians.

Pedestrian Transition Detection

Figure 4:
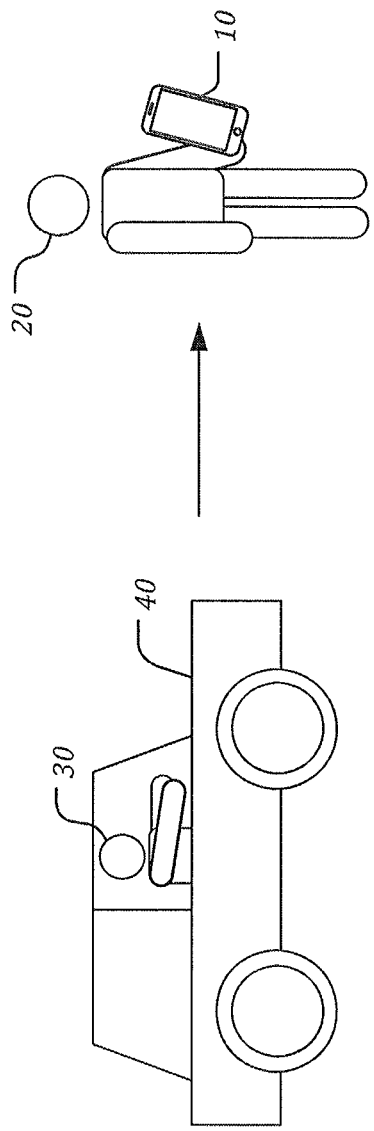
FIG. 4 is a schematic illustration of a driver to pedestrian transition.
Figure 5:
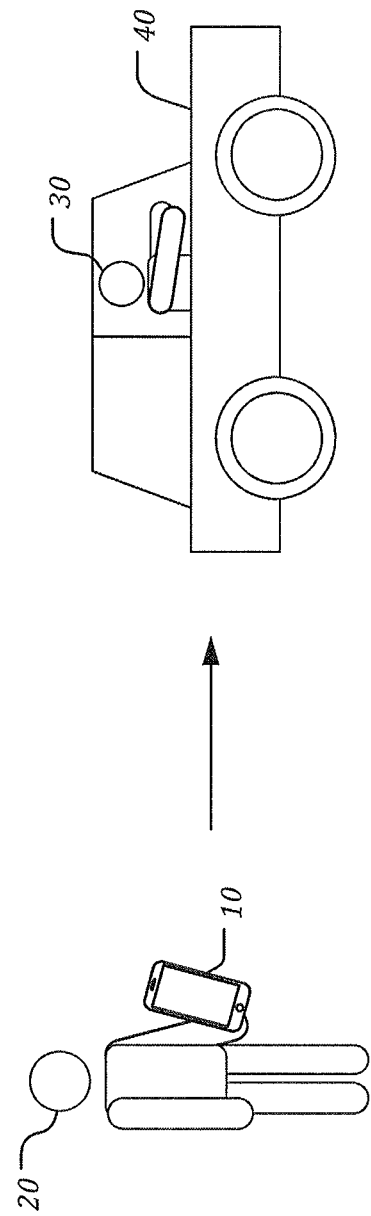
FIG. 5 is a schematic illustration of a pedestrian to driver transition.

In another embodiment, the V2P communications system and methods may be applied to the detection of a transition state of a pedestrian (FIGS. 4-5). In one aspect, V2P enabled devices associated with the pedestrian are in communication with a vehicle to detect a driver-pedestrian transition and the intention of a pedestrian to traverse a roadway to interact with (e.g., drive) a vehicle.

In one example, the V2P system may be applied to detect a transition of a driver to a pedestrian and vice versa. This transition state information may be useful to help vehicles detect a potential pedestrian presence in the area, and may also be used to regulate a device associated with the pedestrian, for example, to turn the safety message transmission on or off for the purpose of reducing power consumption V2P applications and transmissions associated with the device.

Referring to FIG. 4, a driver 30 to pedestrian 20 transition may be detected with the V2P communications system and methods. One type of driver to pedestrian transition occurs when a driver 30 of a vehicle 40 parks the vehicle, and upon exiting the vehicle, is now classified as a pedestrian 20. The transition may be detected, for example, by a door ajar signal generated by the vehicle sensor output bus and communicated to the V2P enabled device 10 associated with the driver of the vehicle. Alternatively, or in addition, a g-sensor or other sensor output associated with the device may be used to detect the transition.

In one aspect, the accelerometer on the device 10 may provide a 3-D acceleration pattern which is characteristic of movement of a phone from an interior of the vehicle 40 (e.g., sitting on the seat in a bag, or in the pocket of the driver 30) to outside the vehicle 40. For example, after a period of generally horizontal movement while the vehicle 40 is in motion, the horizontal movement may stop as the vehicle 40 stops. Thereafter, the vertical acceleration may spike (e.g., device 10 being picked up) followed by horizontal movement (e.g., device 10 being handled within the vehicle 40), and then vertical movement as the driver 30 exits the vehicle 40 and stands up. The device 10 may then experience a typical walking related movement pattern. In one aspect, a device 10 may be able to sense operation of a door of a vehicle 40 (e.g., audible or motion characteristic, signal from vehicle 40) to predict a transition from a driver 30 to a pedestrian 20. In a further aspect, this information may be sent as part of the BSM from a device to inform the surrounding road users/drivers/pedestrians, to be alerted of a potential pedestrian presence.

Referring to FIG. 5, a pedestrian to driver transition may be detected with a V2P system. One type of pedestrian to driver transition occurs when a pedestrian 20 approaches and enters a vehicle 40 such that the pedestrian is now classified as a driver 30. The transition may be detected, for example, When a pedestrian walks towards an associated vehicle and actuates a vehicle unlock signal (e.g., with a keyless fob). The vehicle 40 associated with the pedestrian may send BSMs to inform the surrounding road users of a pedestrian approaching the vehicle. If a roadway lies in between the vehicle and the pedestrian, a device associated with the vehicle or the pedestrian may send an alert that a pedestrian is potentially intending to cross the roadway as part of a BSM. The surrounding drivers and pedestrians will be able to prepare for the presence of a pedestrian and the transition of the pedestrian to becoming a driver, along with the possibility of a roadway crossing.

In a third aspect, a number of triggers, such as a vehicle door ajar signal, starting or stopping of the engine, or a characteristic movement of a V2P enabled device associated with the driver/pedestrian may be detected in order to turn on or off the BSM transmission and related applications in order to reduce power consumption by the device. In one example, the V2P enabled device 10 is a smart phone running a V2P application. When the driver associated with the device exits a vehicle and transitions to become a pedestrian, a signal is detected, such as a door lock signal, and the application activates transmission of a BSM. At a later time, the pedestrian returns to the vehicle. Upon entering the vehicle and transitioning to a driver, a signal, such as a door unlock signal is detected and the application on the smart phone deactivates transmission of the BSM. In one example, a second V2P device integrated with the vehicle may now accept responsibility for transmitting the BSM.

Distracted Driver Detection

In yet another embodiment, the V2P system and methods, may be applied to the detection of a driver's current state of attentiveness to the surroundings, which may include the presence of one or more pedestrians. In one aspect, the reliability of detection may be improved by detecting, for example, a driver's cell phone usage information, the distance of their phone to the steering wheel, and/or the interaction of a driver with a sensor on the steering wheel.

In certain applications of the V2P system, a driver of a surrounding vehicle (peripheral driver) may be alerted to the behavior of a given driver associated with a V2P device. In one aspect, a peripheral driver may be frustrated by a slow-leading vehicle as the reason for the reduced speed of the lead vehicle is unknown. With driver distraction information exchanged among the vehicle drivers and other road users by way of the V2P system, drivers, pedestrians and other road user's anxiety levels may be reduced.

In one example, V2P technology may be based on broadcast wireless information. Each device in the system may have a unique ID. The device may broadcast information and any other device within the communication range may receive the information. Each device takes the information received from each other device within range and determines whether the information received is relevant. For example, messages received by a V2P equipped vehicle from another vehicle located 400 meters away may not be as relevant as a message received from a vehicle located 50 meters away in a blind spot of the receiving vehicle, or located 100 meters away and heading towards the receiving vehicle. In one aspect, filtering and analysis of received messages may be based on a predicted probability of collision or occurrence of another threat. Accordingly, a V2P system may be capable of monitoring and/or prioritizing multiple subjects or threats.

In another aspect, a device associated with a vehicle may detect its own driver being distracted. In one example, a range-sensitive antenna may be installed in the steering wheel to measure the distance between the steering wheel and the mobile device operated by a driver. Alternatively (or in addition to the antenna), a driver-facing camera may be used to determine a distraction state of the driver.

In certain scenarios, a driver may operate a vehicle without the use of the hands, such as in the case of the driver operating the wheel with his or her knees. A touch/load sensor may detect the use of knee-based operation of the vehicle and determine, optionally in conjunction with one or more additional sensors, the distraction state of the driver. In one implementation, a load sensor may be built into the steering column. In this case, the load on the steering column will be different if a driver has his or her hands on the steering wheel or if another extremity (e.g., knees) is incident upon the steering wheel for control. In another implementation, a touch sensor may be deployed around the perimeter of the steering wheel to detect steering without the use of the hands. In yet another implementation, the distraction state of the driver may be detected by the driver's mobile device (e.g., a smart phone). In this case, the smart phone may be configured to interface with the V2P device associated with the driver and/or the driver's vehicle. In one aspect, the V2P device and the driver's smart phone are one and the same.

Information related to the distraction state of the driver may be used by the V2P communication system in multiple ways. For example, the information may indicate to the driver's vehicle to alert the driver to a need to monitor the surrounding. The vehicle's safety system's warning timing and visual interface (if present) may be adjusted accordingly to include more aggressive warnings encompassing louder audio, more prominent visual alerts, and the like.

In another example, the information may be used as part of a BSM transmission to inform surrounding drivers and pedestrians that are capable of receiving and processing the BSMs. For example, a following vehicle may now understand that the cause of a leading vehicle's uncharacteristic deceleration is the result of mobile device usage by the offending driver. This piece of information may reduce the following vehicle driver's anxiety level and inform the driving behavior of the peripheral driver. Other drivers and pedestrians may pay extra attention to the vehicle with a distracted driver. For example, a pedestrian with a mobile device capable of processing the vehicle's BSM may be informed to be extra cautious if the pedestrian plans to cross the street.

Distracted Pedestrian Detection

In still another embodiment, the V2P communications system and method may be applicable to the detection and transmission of a pedestrian's attentiveness level. In one example, the V2P system may detect usage of a device by a pedestrian and subsequently transmit usage information related to whether the pedestrian may be playing music, texting, talking on the phone, and so forth. In certain embodiments, this information may be useful for vehicle drivers and other pedestrians with V2P enabled devices capable of BSM transmission and safety application processing. For example, the information may be used to manually or automatically adjust the vehicle's on board pedestrian warning system. For example, more aggressive timing for warnings and louder audio output external to the vehicle to warn the driver and the pedestrian may be implemented due to the expected lack of response from the pedestrian.

In one aspect, a BSM from a V2P enabled device, may be used to analyze the movement of the device (e.g., acceleration, speed, heading change, etc.) and estimate whether the device is being held in a hand or in a pocket, purse, backpack, or the like. A device carried in a pedestrian's hand will have a distinctive movement pattern compared to a device that is in a bag or in a pocket. In another aspect, a light sensor associated with the pedestrian's V2P enabled device may be used to detect if the device is held in a hand or stored in a pocket. For example, a light sensor may detect a current light level to determine whether the associated device in located within an enclosure or not. Upon the determination of the likelihood that the device associated with the pedestrian is held in the hand of the pedestrian, the device associated with the vehicle may adjust the parameters of the vehicle alert system accordingly.

In some embodiments, the detection of the distracted pedestrian may result in the presentation of a variable, situation-dependent audio/visual interface. For example, if a pedestrian is using a V2P enabled device to send a text message, a device associated with the vehicle may automatically sound the vehicle's horn to warn the pedestrian. In another example, if the pedestrian is using a device to listen to music, then a combination of flashing the vehicle's headlights and sounding the vehicle's horn may be a better contextual warning given that the pedestrian's hearing may be impaired by the use of headphones. Furthermore, for the benefit of the driver of the vehicle, an interface in the vehicle may, for example, display a context-dependent alert or adjust the timing of when the alert is provided. In the case of a visually impaired pedestrian, in one aspect, a V2P enabled device may vibrate as a warning the pedestrian.

Figure 6:
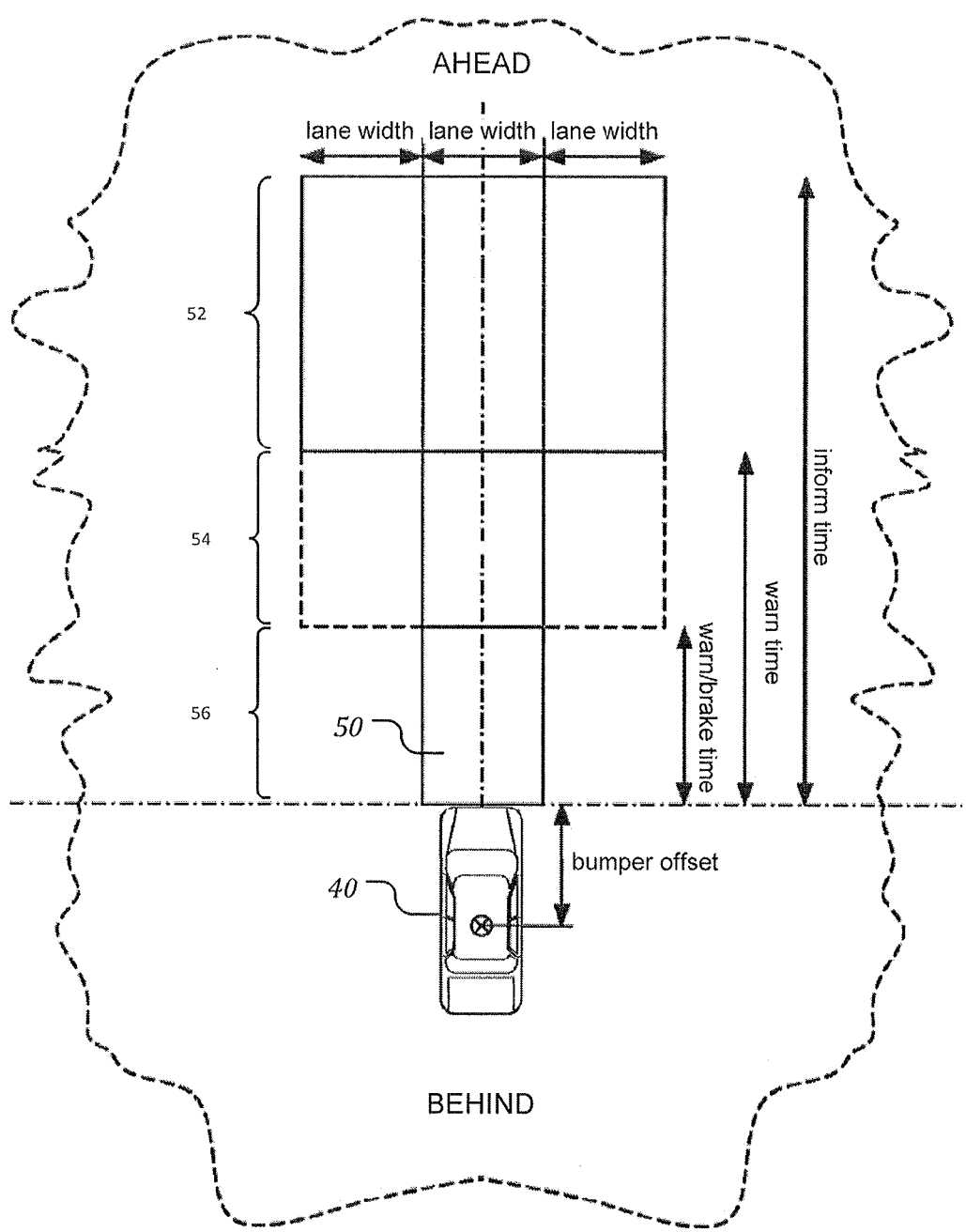
FIG. 6 is a schematic illustration of a vehicle on a roadway with overlaid alert zones.
Figure 7:
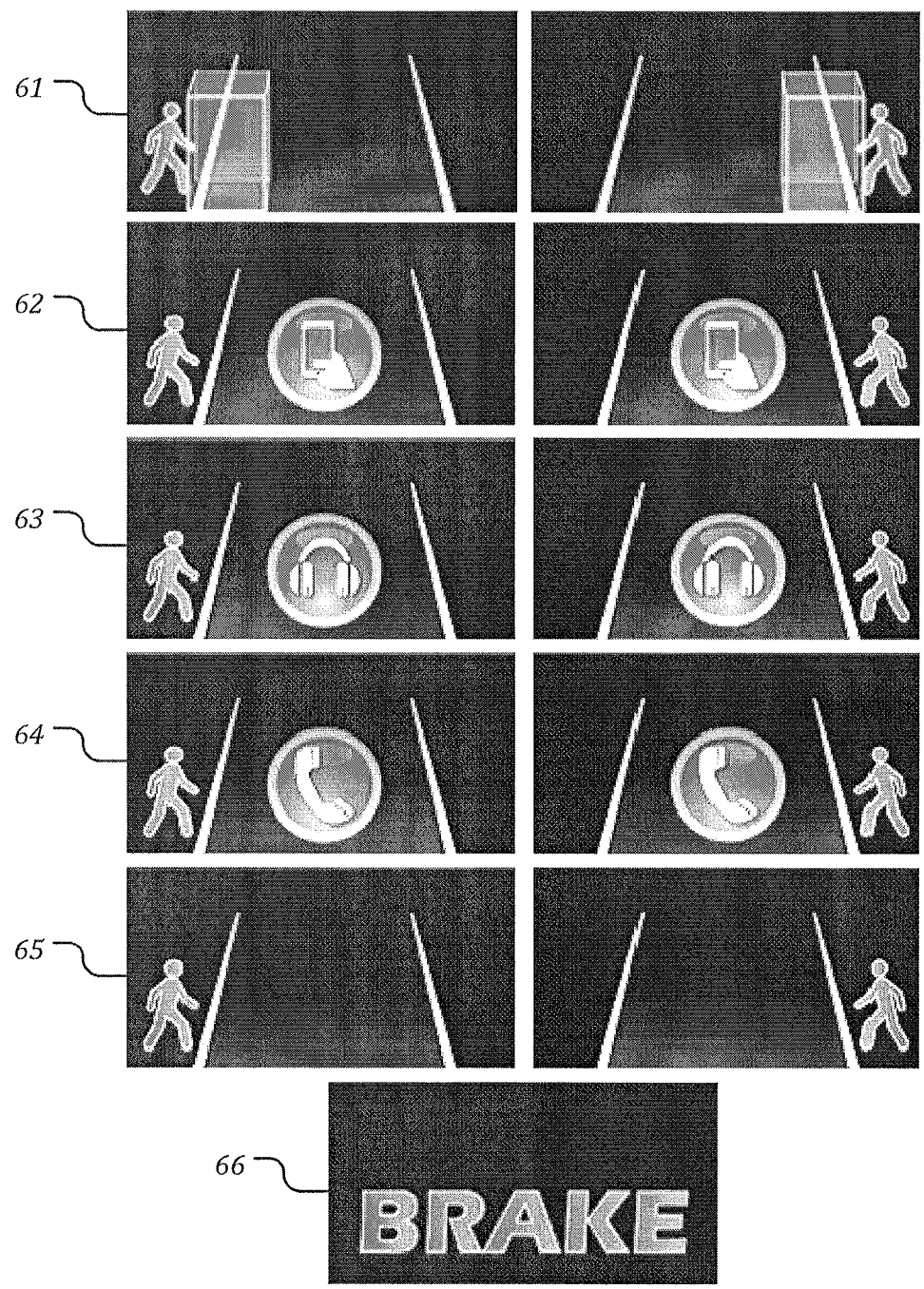
FIG. 7 is a schematic illustration of example alerts that may be provided by a visual interface.

Referring to FIG. 6, a schematic illustration is shown in which a vehicle 40 travels along a roadway 50. If a pedestrian (not shown) enters the roadway, an alert may be generated based on the distance of the pedestrian from the vehicle 40 as shown by the overlaid inform zone 52, warn zone 54, and warn/brake zone 56. In some embodiments, the inform zone 52 and warn zone 54 may include an area that is about three lane widths wide, whereas the warn/brake zone 54 may include an area that is about one lane width wide. In FIG. 7, an exemplary set of alerts are shown which may be provided to either the driver of the vehicle or the pedestrian via an interface associated with a vehicle or a device. The alerts may indicate a hidden pedestrian 61, a pedestrian distracted by operation of a device (e.g., texting) 62, a pedestrian listening to music 63, a pedestrian talking on a phone 64, and a pedestrian approaching the roadway 65.

Figure 8:
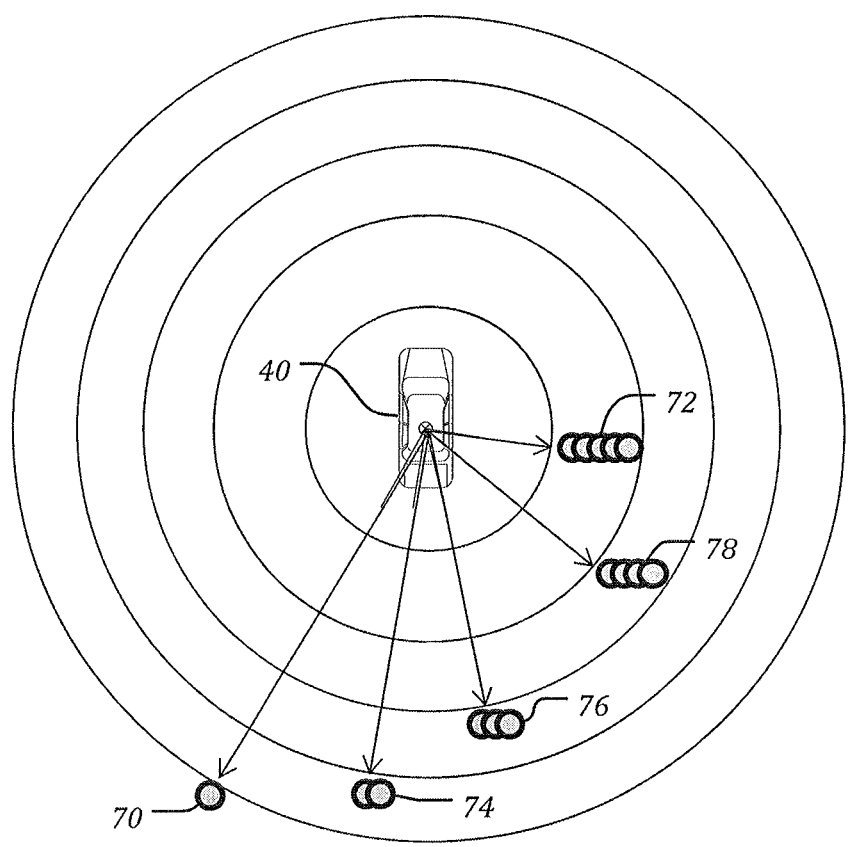
FIG. 8 is a schematic illustration of a varying alert as a function of a vehicle's distance to a pedestrian.

The alerts may be presented based on a location of the pedestrian relative to the vehicle (driver's side vs. passenger side). The alerts may also indicate that the driver should brake 66. Referring to FIG. 8, the alerts may also be specific to a distance of a pedestrian to a vehicle. For example, a single audible signal 70 may alert the driver of vehicle 40 that a pedestrian is somewhat close to the vehicle (e.g., 100 feet), whereas a multiple or repeated audible signal 72 may indicate that a pedestrian is very close to the vehicle 40 (e.g., 5 feet). Intermediate audible signals 74, 76 and 78 may include an intermediate number of repeated alerts to differentiate from the larger distance indicated by signal 70 and the smaller distance indicated by signal 72.

Furthermore, if a pedestrian is hidden behind an object such as a building, or otherwise blocked from the view of a driver, the V2P system may alert the driver in a corresponding manner (e.g., alert 61 in FIG. 7). The V2P system may, in some embodiments, be configured to detect the presence of an object, such as a tree or a building, between a driver and a vehicle. In one aspect, the location of certain objects is stored in a database accessible to a V2P enabled device. In another aspect, the hidden pedestrian may be anticipated based on the GPS coordinate of the pedestrian and the driver in conjunction with map data. For example, the pedestrian may be located on a roadway that intersects a roadway on which the driver is traveling. The presence of the intersection is determined based on map data and the location of the pedestrian and the vehicle is determined based on GPS coordinates obtained from associated V2P enabled devices. In a third aspect, a vehicle or device may be configured with a RADAR/SONAR system, video sensor (e.g., driver facing video camera) or other comparable system for the detection of objects.

In this case, if an object is detected between the vehicle and the pedestrian, the hidden pedestrian alert is presented to the driver or pedestrian. In a fourth aspect, the vehicle may be equipped with an optical device such as a front- or rear-facing camera. In this case, the optical device is configured to detect objects within a field of view. If it is determined that a pedestrian is in the vicinity of the vehicle, it may be determined that a pedestrian is hidden by an object within the filed of view of the optical device. In one example, facial recognition is used to determine if the pedestrian is visible. In another example, the information collected by the optical device and GPS coordinates of the pedestrian are combined to determine if the pedestrian is hidden.

Pedestrian Trajectory Prediction

In still another embodiment, the V2P communications system and methods may be applied to the analysis of a pedestrian's path history (e.g., GPS position vs. time) to improve, for example, vehicle-pedestrian collision warning system performance. In one aspect, the BSM from the device associated with the pedestrian may include the path history of the pedestrian, for example, as calculated by the device. This capability may be useful to assess the behavior of a pedestrian and predict the future path of the pedestrian.

In one example, a V2P enabled device associated with a pedestrian, such as mobile phone or other devices capable of processing and transceiving safety messages, frequently transmits an awareness message such as a BSM. In one aspect, the message contains additional information, such as the class of pedestrian (e.g., a child, a wheelchair user). In another aspect, a device associated with the pedestrian records a path of the pedestrian. For example the last 300 meters of the pedestrian's path are recorded on the device. The path data may be represented as an array of points including GPS, latitude, longitude, time offset, acceleration and other like attributes.

In another aspect, a vehicle may use the BSMs or other messages received from the device associated with the pedestrian and calculate the path history. The vehicle may then use the path history data to determine the probability of a future trajectory/path of the pedestrian, such as the likelihood of street-crossing. Additional information may support the calculation of the future path of the pedestrian, such as the current heading and acceleration of the pedestrian, an approach of the pedestrian to a roadway, or predicted travel path of the vehicle. Furthermore, the path history may be used to detect the movement pattern of the pedestrian, such as walking, running, jogging, hopping, or a random movement. The characteristic pattern may be analyzed by a vehicle or a device. For example, hopping may be indicative of a child pedestrian, whereas random movements may be indicative of an inebriated pedestrian.

The further classification of the pedestrian may be used to modify an alert provided by the vehicle or another device. For example, for a running pedestrian, the warning timing may be adjusted based on the speed of the pedestrian. In the case of a hopping pedestrian or an inebriated pedestrian, the vehicle may warn the driver to use caution or indicate the presence of a randomly moving pedestrian. The above system and methods also apply to the device associated with the pedestrian. In one aspect, a device safety application may use the same path history information to improve its safety application performance.

Additional scenarios for implementation of a V2P communications system & methods are described in Table 2.

TABLE 2

Exemplary Scenarios for V2P Communications System & Methods

| Category | Exemplary Embodiment(s) |
|---|---|
| Wheelchair | Device detects pedestrian is disabled and includes that information in the BSM. Vehicle adjusts warning/information accordingly. Detection of wheelchair may involve analysis of motion characteristics using G-sensor (slow moving and without periodic vertical movement) or with button input by a user. May be used for blind people, for example, by detecting cane motion/sound. |
| Path history of pedestrian | Path history of a pedestrian may be used to estimate likelihood of pedestrian crossing a street. It is more likely if history indicates fast rate of travel (walking/running), perpendicular to a street, or the like. The likelihood is reflected via an interface. Pedestrian's movement may be estimated with a G-sensor, or by detecting a walking or running rhythm. |
| Headlight control | If pedestrian is detected at night, the headlights may be made to shine in the direction of the pedestrian. Light angle changes in the presence of pedestrian or honking a horn. See also: Data fusion with camera |
| Distracted (e.g., texting) driver | Detection of a distracted driver by a driver in a following vehicle, or by surrounding infrastructure. One method to detect a distracted driver is to have a range-sensitive antenna in the steering wheel. Another method includes a driver oriented camera. Driver may be warned with a steering wheel vibration. A driver operating a vehicle without the use of the driver's hands (e.g., with knees) may be detected with a load sensor in the steering wheel or a touch sensor in the steering wheel. |
| Child with device | Methods to detect children using a device with manual input (e.g., parental controls), or smart context sensing (e.g., precise elevation threshold from GPS receiver in the device). Movement pattern may differentiate children from adults. Additional information on device may also be analyzed for identification of a child (e.g., social media login information). |
| Distracted pedestrian | Detect distracted pedestrian and present different interface to pedestrian. If pedestrian is texting, vehicle may produce audible alert (honk horn), if pedestrian is listening to music, an alert may include both an audible and a visual component (e.g., flash headlights and honk horn). For a driver, an interface may show a different display, timing of alerts may be modified, a wider alarm zone may be applied, etc. For a blind pedestrian, the pedestrian's device may vibrate. The vehicle may prepare for emergency braking. An interface of the device may provide an alert. A light sensor may be used to detect if a device is in a hand or in a pocket. |

TABLE 2-continued

Exemplary Scenarios for V2P Communications System & Methods

| Category | Exemplary Embodiment(s) |
|---|---|
| Vehicle to pedestrian transition | Vehicle sends a door open message to the device of the exiting pedestrian. A G-sensor in the phone may also be used to detect the transition to a pedestrian. |
| Data fusion with camera | Different interface modes are enacted when the camera cannot detect a pedestrian. If vehicle camera may detect a pedestrian and DSRC detects pedestrian, the system shows a particular warning to the driver, especially if a driver is looking forward. If only DSRC detects pedestrian but camera does not (e.g., non-line-of-sight propagation or low light/inclement weather scenario) an interface displays a different alert. |
| Using pedestrian motion | Detect walking, stopping, trotting, and the like. See also: Path history of pedestrian |
| Unlock information | Vehicle may predict that pedestrian will not cross a street. Pedestrian use of key fob (e.g., unlock button) may be detected. Alerts may be adjusted as appropriate. Internal signal, key fob, a device, and the like may have dedicated functions for integration with V2P system. |
| VRU detection using G-sensor in device | System may be used to classify certain pedestrians (e.g., a bicyclist, running pedestrian) as higher priority objects for alert generation. See also: Path history of pedestrian |
| Sidewalk GPS information | Maps data may be used to make adjustments to an interface in order to reduce false alarms. Data may be further used to anticipate a pedestrian transition to a driver or a vehicle leaving a parking lot. Information may be used for advanced parking spot finder applications to predict a pedestrian destination. See also: Unlock information |
| Inebriated pedestrian | Detect characteristic movements (e.g., wandering, staggering) via motion sensor or path history. Geographic information such as distance to a public house or bar may also be used. |
| Intelligent speed adaptation (ISA) using pedestrian info | Estimate safe driving speed using pedestrian information such as distance, pedestrian path direction and speed, pedestrian distraction level, characteristic movement and the like. Geographic information, such as locations of sidewalks, crosswalks, or places common pedestrian areas may also be used. Estimated safe speed may be used to guide the driver or the speed may be limited automatically. |
| Detect a pedestrian distraction state in the absence of a message from the pedestrian | Detect a pedestrian's distraction state without using a message (BSM) from a pedestrian. One method uses the difference of a received radio or G-sensor signal from a device in a pedestrian's hand, a pocket or a bag. |
| Device to Transportation | A used (e.g., pedestrian) desires to communicate with a public/private transit operator (e.g., bus driver). Operator may be alerted to position and destination of the user. |

Further Examples

Turning to FIGS. 9-13, example algorithms for use with a V2P communication system may include vehicle and pedestrian trajectory prediction. In one aspect, a vehicle trajectory may be predicted based on a yaw rate of the vehicle 40 (FIGS. 9 and 10). In one aspect, a yaw rate may be used to predict a heading of the vehicle 40 in radians (rad). Thereafter, the warn zone 54 and the warn/brake zone 56 may be determined based on parameters such as a known or measured lane width of the road 50 in meters (m), a bumper offset of the vehicle 40 in meters (m), or a velocity of the vehicle 40 in meters per second (m/s). The warn zone 54 and the warn/brake zone 56 may correspond to zone 54 and zone 56 illustrated in FIG. 6. A warn/brake zone 56 may include a first distance extending along a path of the vehicle 40 from the front bumper of the vehicle. The first distance may be determined based on a known or predetermined warn/brake time in seconds (s) multiplied by the current velocity (m/s) of the vehicle 40. By comparison, a warn zone 54 may include a second distance extending along a path of the vehicle 40 from the end of the warn/brake zone 56. The second distance may be determined based on a known or predetermined warn time in second (s) multiplied by the current velocity (m/s) of the vehicle 40.

Figure 11:
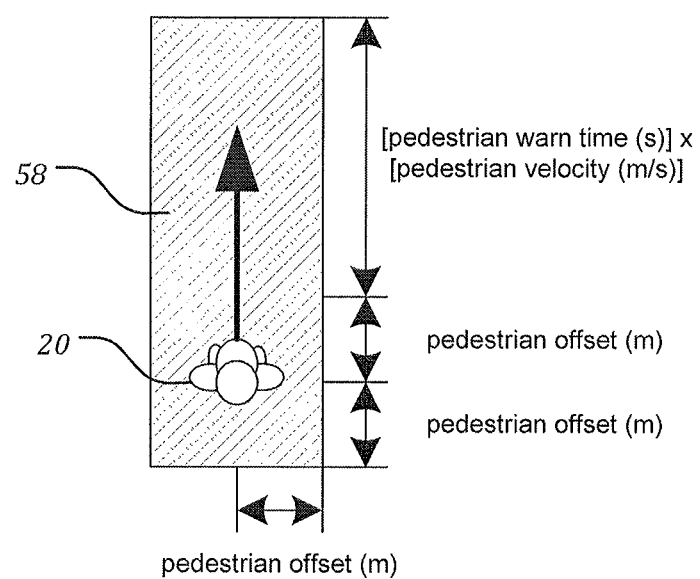
FIG. 11 is a schematic illustration of pedestrian path prediction algorithm.

With reference to FIG. 11, a pedestrian trajectory may be predicted based on a current heading of a pedestrian 20. A pedestrian zone 58 may be defined based on parameters such as a known or estimated width (offset) of the pedestrian 20 in meters (m), a pedestrian warn time (s) or a pedestrian velocity in meters per second (m/s). In one aspect, a pedestrian zone 58 may include a distance extending along a path of the pedestrian 20 from the front of the pedestrian 20 (or pedestrian offset distance). The distance may be determined based on a known pedestrian warn time (s) multiplied by the current velocity (m/s) of the pedestrian 20.

Figure 12:
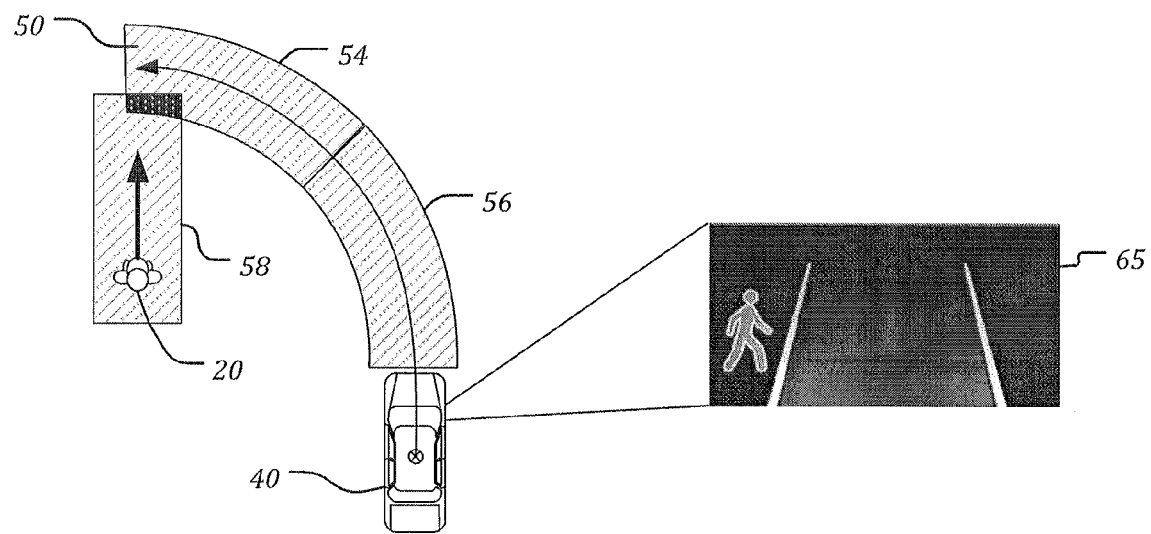
FIG. 12 is a schematic illustration of an algorithm for predicting the intersection of a pedestrian path with a vehicle path in a vehicle warn zone.
Figure 13:
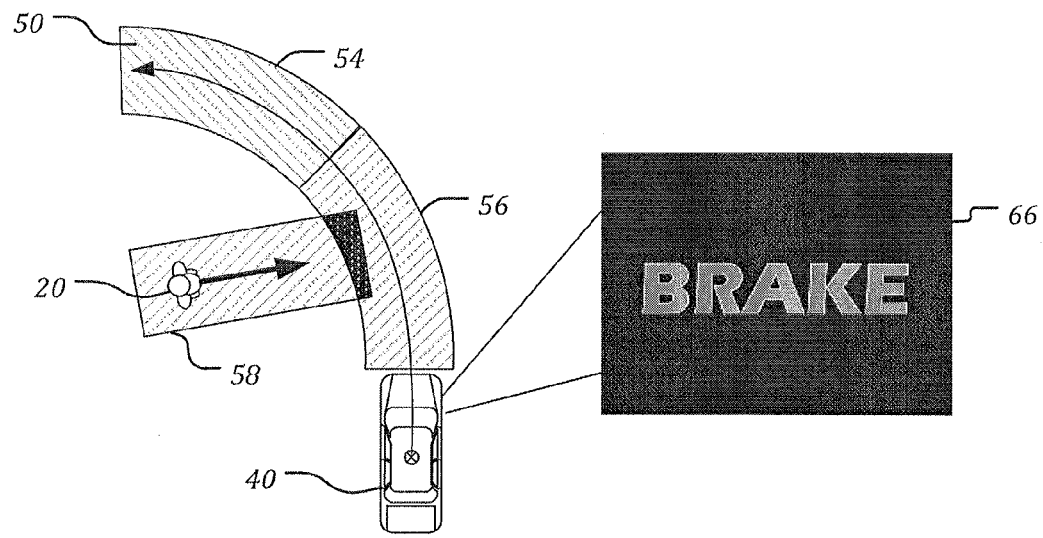
FIG. 13 is a schematic illustration of an algorithm for predicting the intersection of a pedestrian path with a vehicle path in a vehicle warn/brake zone.

In some embodiments of a V2P communication system, either a device associated with the pedestrian 20 or a device associated with vehicle 40 may be used to calculate one or more of the vehicle trajectory, vehicle warn zone 54, vehicle warn/brake zone 56, pedestrian trajectory, and pedestrian zone 58. Moreover, one or more of the aforementioned calculations may be transmitted as a component of a BSM. As shown in FIGS. 12 and 13, this information may be used to determine whether or not a pedestrian zone 58 may intersect with a vehicle warn zone 54 (FIG. 12) or warn/brake zone 56 (FIG. 13). In one aspect, if a pedestrian zone 58 intersects with a vehicle warn zone 54, then a human machine interface (HMI) or other like alert display associated with vehicle 40 may display an alert 65 indicating a pedestrian 20 approaching the roadway 50 from the left. In another aspect, if a pedestrian zone 58 intersects with a vehicle warn/brake zone 56, then an HMI associated with vehicle 40 may display an alert 66 indicating that the driver of the vehicle 40 should brake.

Figure 15:
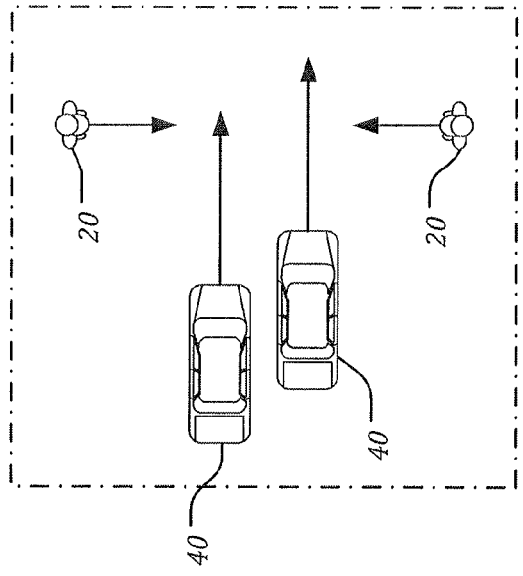
FIG. 15 is a schematic illustration of a pedestrian traveling along a generally perpendicular path to a vehicle.
Figure 14:
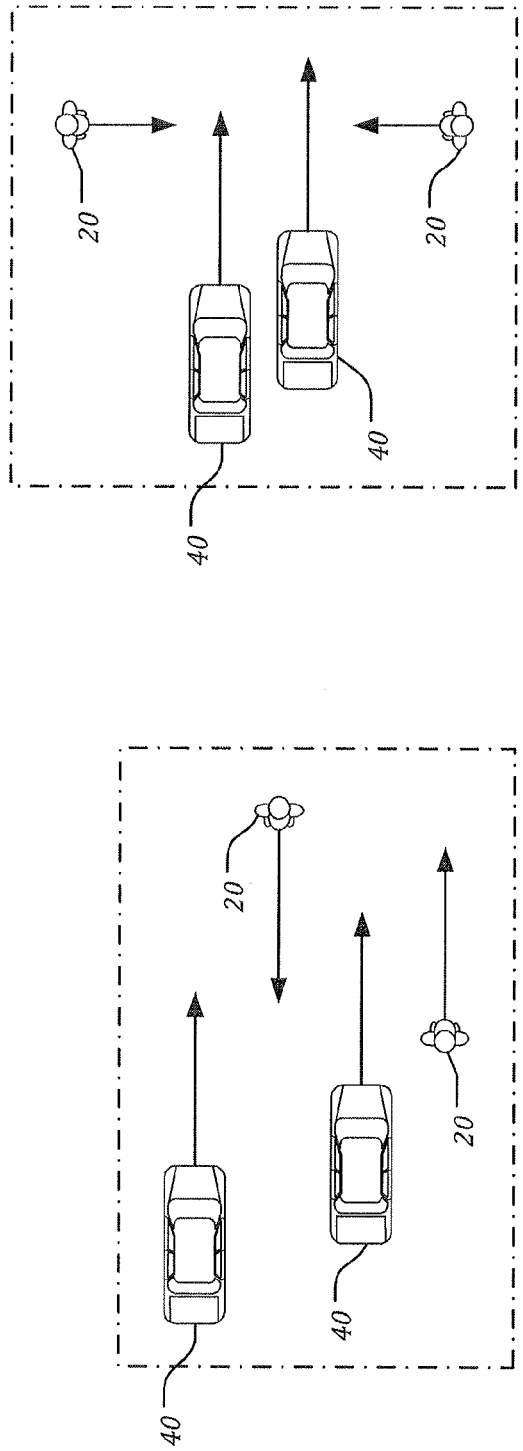
FIG. 14 is a schematic illustration of a pedestrian traveling along a generally parallel path to a vehicle.
Figure 16:
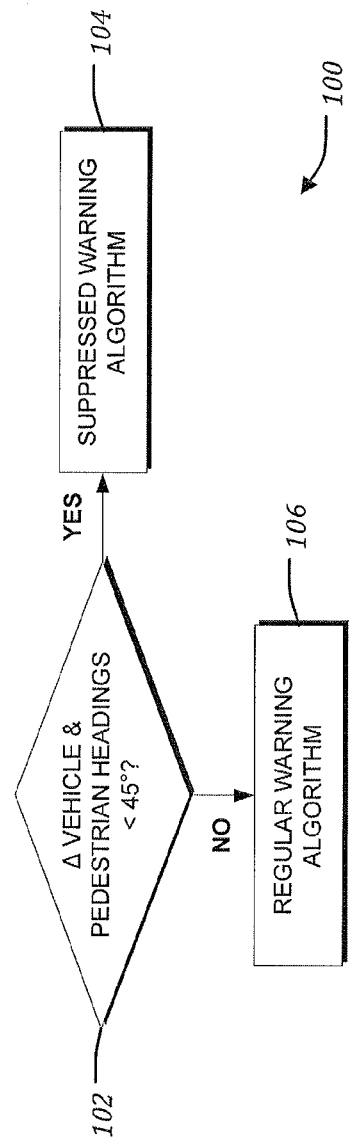
FIG. 16 is a schematic illustration of an example method for selecting between a regular warning algorithm and a suppressed warning algorithm for scenarios such as those illustrated in FIGS. 14 and 15.

Turning to FIGS. 14-16, a further example algorithm for use with a V2P communication system may include vehicle and pedestrian heading difference calculations. Using one or more trajectory prediction techniques, it may be determined that a pedestrian 20 is headed in a generally parallel direction to a vehicle 40 (FIG. 14) or that a pedestrian 20 is headed in a generally perpendicular (or other angular) direction to a vehicle 40 (FIG. 15). Accordingly a device associated with a pedestrian 20 or vehicle 40 may determine an angle between the heading or trajectory of the pedestrian 20 and the heading or trajectory of the vehicle 40. In a method 100, a determination may be made in a step 102 as to whether the angle between the headings of the pedestrian 20 and vehicle 40 is less than about 45 degrees. If the angle is less than about 45 degrees (see, e.g., FIG. 14), then in a step 104, a suppressed warning algorithm may be relied upon for further calculations by a device associated with either pedestrian 20 or vehicle 40. In one aspect, the device associated with the vehicle 40 may determine in a step 104 to suppress the display of a warning to a driver of the vehicle 40 as a pedestrian 20 travelling parallel to the vehicle 40 may not pose a threat. However, if a determination is made that the angle is greater than about 45 degrees (see, e.g., FIG. 15), then in a step 106, a regular warning algorithm may be relied upon for further calculations by a device associated with either pedestrian 20 or vehicle 40. For example, an HMI associated with the vehicle 40 may provide an alert 65 to the driver of the vehicle 40 indicating that a pedestrian is approaching from the right or left as appropriate.

Figure 17:
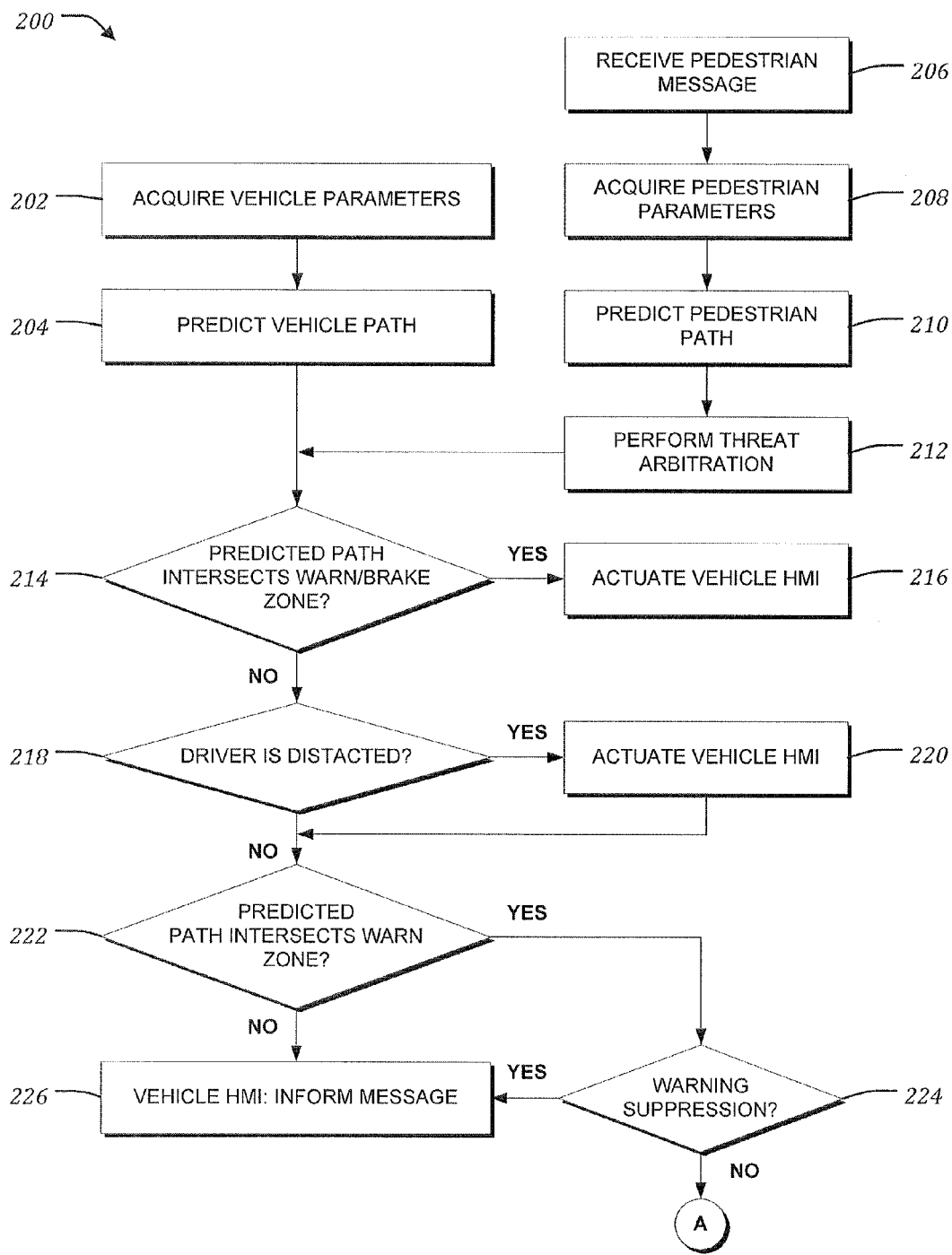
FIG. 17 is a schematic illustration of an example method for use with a V2P communication system.
Figure 18:
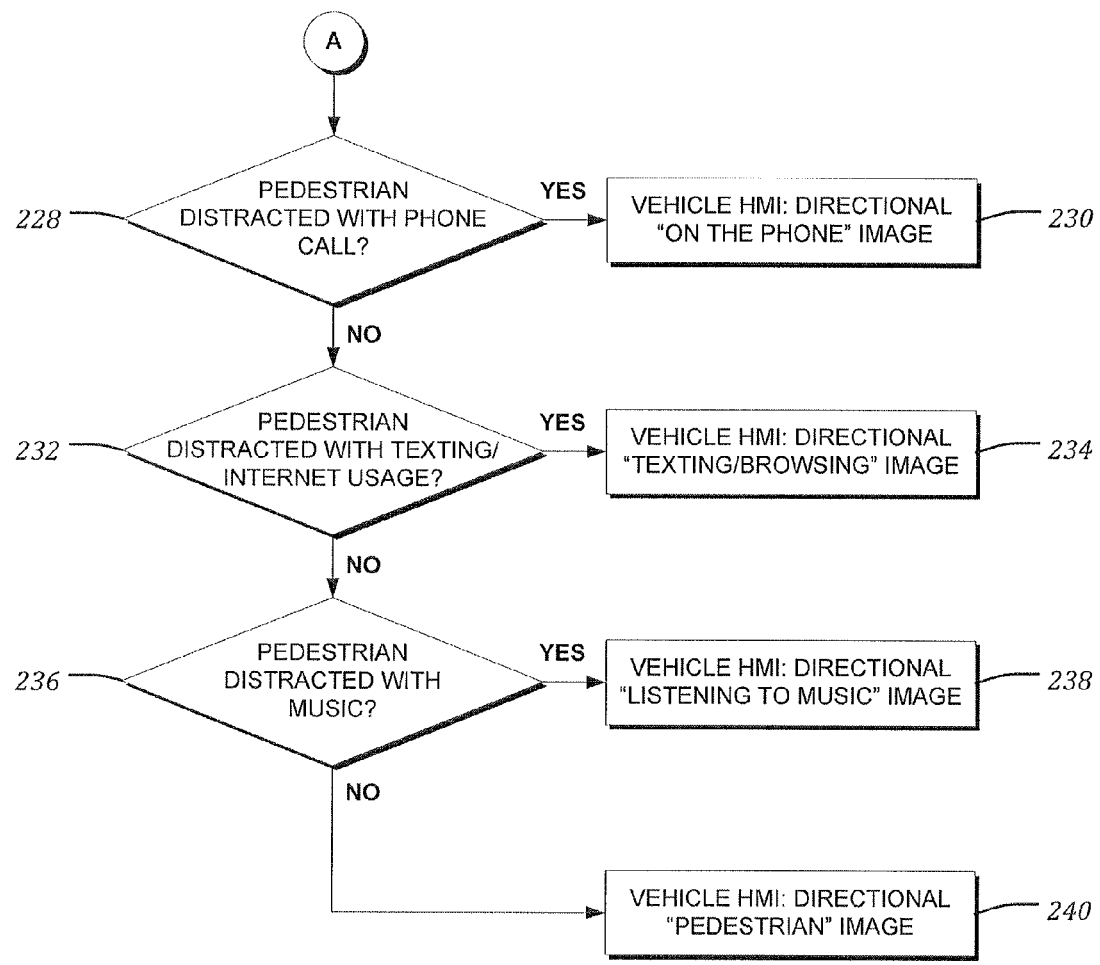
FIG. 18 is a continuation of the method of FIG. 17.

In some embodiments, a V2P communication system may include one or more methods for providing a warning or other alert to one or more pedestrians, one or more vehicle drivers, or a combination thereof. In one example, a method 200 as shown in FIGS. 17 and 18 may include a step 202 of acquiring vehicle parameters. Acquiring vehicle parameters can include measuring or recording information such as the GPS coordinates of the vehicle, the heading, speed, yaw rate, or brake state of the vehicle, the level of distraction of a driver of the vehicle, or other like information. The information may be acquired by communicating with one or more system or processor within the vehicle. The vehicle parameters acquired in the step 202 may then be used in a step 204 individually or in combination with other information to predict a path (e.g., a trajectory, heading, or the like) of the vehicle.

By comparison, a step 206 of the method 200 may include receiving a message from a pedestrian equipped with a V2P device. In one aspect, the message received in the step 206 may include information such as one or more pedestrian parameters. In another aspect, the message received in the step 206 may simply include an indication that there is a pedestrian in the vicinity of the vehicle. Thereafter, a step 208 may include acquiring one or more pedestrian parameters such as the GPS coordinates of the pedestrian, the heading, speed or movement pattern of the pedestrian, the distraction level of the pedestrian, or other like parameters. The parameters acquired in the step 208 may be used in a step 210 to predict a pedestrian path. Prediction of a pedestrian path in the step 208 and prediction of a vehicle path in the step 204 may include a preliminary analysis to determine whether there is any possibility of a collision between the pedestrian and the vehicle. Accordingly, a step 212 may include performing threat arbitration to determine the probability of a collision between a vehicle and two or more distinct pedestrians. For example, if multiple pedestrians are predicted to have a path that will intersect with a path of the vehicle, the step 212 may include determining the pedestrian with the highest probability of intersecting the path of the vehicle. Alternatively (or in addition), the step 212 may include determining which of the pedestrians may have the highest probability of intersecting the warn/brake zone of the vehicle.

With continued reference to the method 200 in FIGS. 17 and 18, a step 214 may include a determination as to whether a predicted path of the pedestrian intersects with the warn/brake zone of the vehicle. In one example, the warn/brake zone of the vehicle may be determined in the step 204. If the path of the pedestrian is determined or predicted to intersect with the warn/brake zone of the vehicle, then in a step 216, an HMI of the vehicle may be actuated to display a corresponding alert, such as the alert 66 in FIG. 7. By comparison, if the path of the pedestrian is not predicted to intersect the warn/brake zone of the vehicle in the step 214, a determination may be made as to whether or not a driver of the vehicle is distracted. A determination of a level or probability of driver distraction may be determined using any suitable method such as one or more of the methods described herein. If it is determined in the step 218 that the driver is distracted, then in a step 220, the HMI of the vehicle may be actuated to display or otherwise provide a corresponding alert, such as an audible alert to the driver. Alternatively (or in addition), an alert may be provided to the pedestrian or a driver of another vehicle indicating the distracted status of the driver. However, if the determination is made that the driver is not distracted in the step 218, or if the vehicle HMI is actuated in the step 220, then the method 200 may proceed to a step 222.

The step 222 may include a determination as to whether a predicted path of the pedestrian intersects with the warn zone of the vehicle. In one example, the warn zone of the vehicle may be determined in the step 204. If the path of the pedestrian is determined or predicted to intersect with the warn zone of the vehicle, then, in a step 224, a determination may be made as to whether or not a warning suppression feature of the V2P system is active in a step 224. If the path of the pedestrian is not predicted to intersect the warn zone of the vehicle in the step 222, or if a warning suppression feature of the V2P system is determined to be active in the step 22, then in a step 226, the HMI of the vehicle may be actuated to display or otherwise provide a corresponding alert, such a basic alert indicating the presence of a pedestrian to one side of the vehicle.

By comparison, if in the step 224 a determination is made that warning suppression is not active, then the method 200 may proceed to a step 228, for example, to determine the status of the pedestrian. The step 228 may include a determination as to whether or not a pedestrian may be distracted with a phone call. In one aspect the pedestrian may be dialing a phone number, receiving a phone call, talking on the phone, or the like. If a determination is made in the step 228 that the pedestrian may be distracted with a phone call, the vehicle HMI may be actuated in a step 230 to display a directional alert indicating the position of the pedestrian relative to the vehicle in addition to an indication of the pedestrian being distracted with a phone call (see, e.g., alert 64 in FIG. 7).

If in the step 228 a determination is made that the pedestrian is not distracted with a phone call, then the method 200 may proceed to a step 232. The step 232 may include a determination as to whether or not a pedestrian may be distracted with a text messaging or internet browsing operation. In one aspect the pedestrian may be sending, reading or receiving a text message, or may be using the phone to access the internet, interact with a web page, or the like. If a determination is made in the step 232 that the pedestrian is distracted with a text message or internet browsing operation, the vehicle HMI may be actuated in a step 234 to display a directional alert indicating the position of the pedestrian relative to the vehicle in addition to an indication of the pedestrian being distracted with a text messaging or internet browsing operation (see, e.g., alert 62 in FIG. 7).

If in the step 232 a determination is made that the pedestrian is not distracted with a text messaging or internet browsing operation, then the method 200 may proceed to a step 236. The step 236 may include a determination as to whether or not a pedestrian may be distracted listening to music. In one aspect the pedestrian may be operating a device to select a song, play a song, or the like. In another aspect, the device may detect whether the device is connected to headphones or a headset. If a determination is made in the step 232 that the pedestrian is distracted by listening to music, the vehicle HMI may be actuated in a step 238 to display a directional alert indicating the position of the pedestrian relative to the vehicle in addition to an indication of the pedestrian being distracted by listening to music (see, e.g., alert 63 in FIG. 7). By comparison, if in the step 236 a determination is made that the pedestrian is not distracted by listening to music, then the method 200 may proceed to a step 240. The step 240 may include actuating the vehicle HMI to display a basic directional alert indicating the position of the pedestrian relative to the vehicle (see, e.g., alert 65 in FIG. 7). It will be appreciated that the method 200 may include one or more additional classification steps in order to convey a status of a pedestrian or driver to another member of a V2P communication system.

As discussed above, a system and method according to the present disclosure may include a distracted driver detection component. Oftentimes, driver distraction may be caused by a driver operating a portable electronic device such as a cell phone, smart phone, or a navigation system while driving a vehicle. However, previous efforts to detect this type of distraction have been unreliable as of yet. Current technology for driver distraction detection may rely on vision or camera systems for monitoring a driver's eyes or gaze, sensors positioned in or on the steering wheel to sense a driver's heart rate or connection to the wheel, or a combination thereof. However, these methods may be unreliable or inaccurate, thereby leading to false positives. Accordingly, the aforementioned methods have not been widely implemented.

In some embodiments, the present system and method may include detection of a driver distraction level, utilization of data related to a driver distraction level, or a combination thereof. The detection of a driver's current level of attentiveness or distraction may include detecting an interaction between a driver and a device. Example devices include those devices described herein, such as a smart phone, a navigation system, a basic cell phone, or the like. The device may be configured to interface with a V2P device associated with the driver, the driver's vehicle, or a combination thereof. Further, the V2P device and the device with which the driver interacts may be one and the same.

In general, a system and method may include detecting or monitoring an interaction between a driver and a device. The system and method may determine a driver distraction level based on data collected during the detecting or monitoring operation. The data may be utilized (e.g., analyzed, transformed, correlated, etc.) to determine a quantitative or qualitative level of distraction. In one example, a quantitative level of distraction may include a value on an absolute or relative scale, such as a value between 1 and 100. In another example, a qualitative level of distraction may include a ranking such as "not distracted", "somewhat distracted", or "very distracted". In yet another example, the quantitative level of distraction may correlate with or correspond to a qualitative level of distraction.

The system and method may interface with a V2P communication device or with another communication device. Accordingly, the system and method may be operable to transmit a message (e.g., a BSM) to nearby vehicles, pedestrians, or a combination thereof. The message may include raw data collected from a detecting or monitoring operation or a result based on the utilization of the raw data, such as a quantitative or qualitative estimation of a driver distraction level. In one example, a V2P device associated with a pedestrian may receive the message related to a driver distraction level. The V2P device associated with the pedestrian may utilize the data to determine the driver distraction level if the distraction level is not provided. The V2P device associated with the pedestrian may further provide the pedestrian with a warning, alert, or analysis of the driver distraction level. The pedestrian may be alerted to the presence of the vehicle from which the message originated. Moreover, the pedestrian may be encouraged to exercise additional caution around the vehicle or take another action (or no action) based on the distraction level of the driver.

Figure 19:
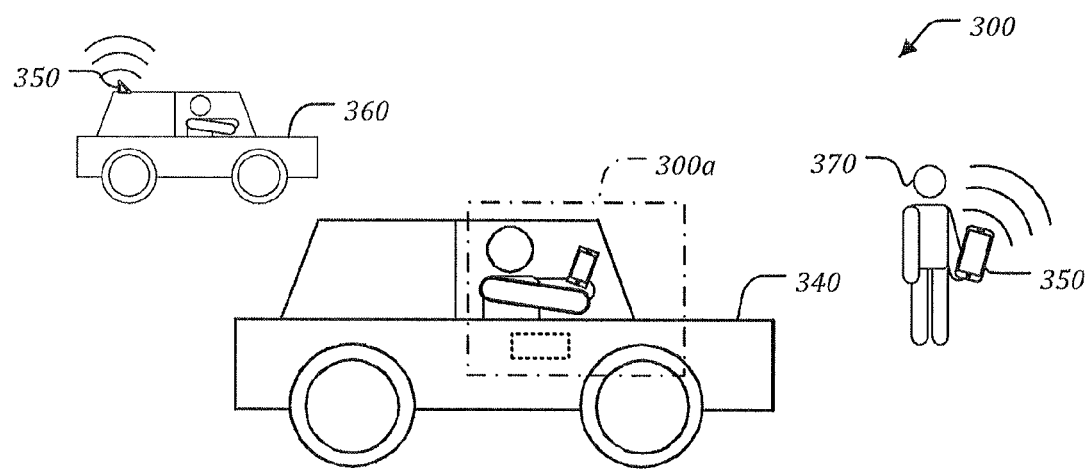
FIG. 19 is a schematic illustration of a system for the detection and utilization of a driver distraction level.
Figure 20:
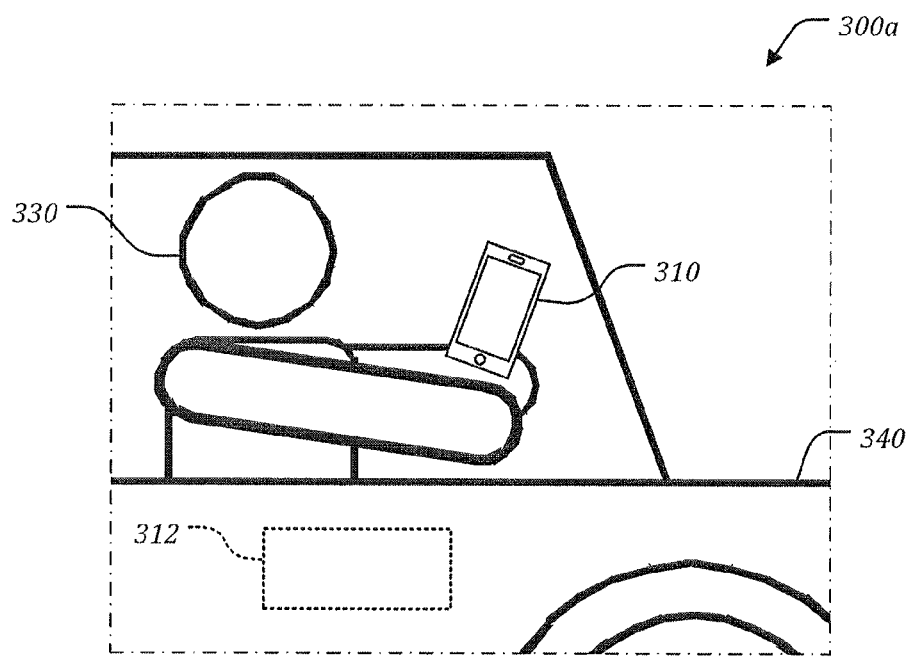
FIG. 20 is an enlarged partial detail view of the system of FIG. 19.

Turning now to FIGS. 19 and 20, a system 300 may include a first device 310 and optionally a second device 312. The first device 310 and the second device 312 may be associated with a driver 330 of a vehicle 340. In one aspect, the first device 310 may be an electronic device such as a smart phone, basic cell phone, navigation system, stereo system, portable music player, or the like. The first device 310 may be integral to the vehicle 340 or a portable device. Further, the first device 310 may be a V2P enabled device. Accordingly, the first device 310 may be capable of transmitting a BSM or other like message to a V2P device 350 associated with nearby vehicles 360, pedestrians 370, or a combination thereof.

In some embodiments, the vehicle 340 includes the second device 312. The second device 312 may be integral to or otherwise associated with the vehicle 340. For example, the second device 312 may be a component integrated into the vehicle 340 by a manufacturer of the vehicle 340 or as an aftermarket component. In other embodiments, the second device 312 may be independent of the vehicle 340. Alternatively (or in addition), the second device 312 may be distinct from the first device 310, but capable of physically or wirelessly coupling to the first device 310. Further, the second device 312 may be in wired or wireless communication with the first device 310. For example, the second device 312 may be configured to monitor or detect the use of the first device 310 by the driver 330. Data or other information related to the first device 310 may be utilized by the second device 312.

In some embodiments, first device 310 or the second device 312 may detect whether or not a driver 330 associated with the first device 310 is operating the vehicle 340. In one example, the first device 310 may include accelerometers for detection a heading of the device 310, which may be correlated to the motion of the vehicle 340. In another example, the device may be integrated with voice or data network or the like for receiving location, speed or heading information, which may be correlated to the motion of the vehicle 340, or otherwise used to determine that the vehicle 340 is in motion. In one aspect, driver distraction level data may be embedded in a message communicated from the first device 310 to the second device 312. Further, various techniques may be used to determine whether it is in fact the driver 330 of the vehicle 340 that is interacting with the first device 310 (as opposed to a passenger, for example). In some embodiments, the vehicle 340 may include a proximity sensor for detecting the location of the first device 310 relative to the driver 330 or another location within the vehicle 340. In one aspect, a proximity sensor may be mounted near the steering column for measuring a range from the steering column to the first device 310. In another aspect, the second device 312 may include a proximity sensor or other like apparatus for distinguishing the operator of the first device 310.

In one aspect, the second device 312 may analyze or transform data related to usage of the first device 310 to determine a qualitative or quantitative driver distraction level. The driver distraction level or data utilized to determine the driver distraction level may be communicated to the nearby vehicles 360 and pedestrians 370 as a component of a BSM by the second device 312. Alternatively (or in addition), the driver distraction level may be communicated back to the first device 310. In the case that the first device 310 is a V2P enabled device, the driver distraction level or related data may be communicated to the nearby vehicles 360 and pedestrians 370 as a component of a BSM by the first device 310. In still other embodiments, data processing or other like utilization of data associated with the interaction of the driver 330 with the first device 310 may be carried out by the first device 310. The utilized data, which may include a driver distraction level, may be communicated by the first device 310 as a component of a BSM, communicated from the first device 310 to the second device 312 for communication as a component of a BSM, or a combination thereof.

With continued reference to the example system 300 in FIGS. 19 and 20, a first device 310 is illustrated as a smart phone and a second device 312 is illustrated as a V2P enabled device integral to the vehicle 340. However, it will be appreciated that alternative devices and systems may be possible as discussed herein. With respect to the detection or monitoring of a driver distraction level, either or both of the first device 310 and the second device 312 may include one or more sensors, receivers, or other like components for acquiring data associated with an interaction between the first device 310 and the driver 330. In the illustrated embodiment, the second device 312 may receive data from the first device 310 related to how the driver 330 is using the first device 310. Example data may include activity such as whether the driver 330 is dialing a phone number, speaking on the phone, inputting a text message (i.e., texting), listening to music, and the like. This information may be utilized by the second device 312 to determine a driver distraction level.

In one aspect, the data associated with the interaction between the driver 330 and the first device 310 may be utilized to quantitatively or qualitatively determine the driver distraction level. In a first example, the driver 330 may simply interact with a power button of the first device 310. The power button may be operable to toggle a display of the first device 310 between an "on" state and an "off" state. In one aspect, the driver 330 may interact with only the power button to view the current time of day, or to turn off the display of the first device 310 in order to conserve the battery of the first device 310. If the interaction between the driver 330 and the first device 310 is limited to a single interaction with the first device 310 as described, then the second device 312 may utilize the interaction data received from the first device 310 to determine that a driver distraction level is low and assign a driver distraction level score of 5 out of 100.

In one aspect, the driver distraction level may be assigned a quantitative score. For example, a driver distraction level may be determined based on a scale from 1 to 100. A score of 1 may be indicative that the driver 330 is not distracted or is not interacting with the device 310, while a score of 100 may be indicative that the driver 330 is completely distracted or interacting heavily with the device 310. An example of heavy interaction may include the driver 330 entering a text message with an input rate of greater than a number of (e.g., 120) characters per minute into the first device 310. However, it will be appreciated that other algorithms may be suitably employed in determining a driver distraction level.

In a second example, the driver 330 may interact with the first device 310 to answer a phone call. The driver 310 may then proceed to actively converse with the caller for a period of time. The first device 310 may communicate with the second 312 to indicate that a voice connection is active (i.e., a voice/call function of the first device 310 is actively sending or receiving data) and whether the driver 330 is speaking into the first device 310. The second device 312 may utilize the data received from the first device 310 to determine a driver distraction level. In one aspect, the second device may determine that the driver 330 is moderately distracted and assign a driver distraction level score of 30 out of 100.

In a third example, the driver may interact with the first device 310 to read and respond to a text-message. The driver 310 may operate the first device 310 to view the text message and then to input a response using a virtual or actual keypad associated with the first device 310. The rate at which the driver 330 types characters with the first device 310 may be at a rate of at least 120 characters per minute, for example. The first device 310 may communicate with the second device 312 to indicate that a text message has been received and that the driver 330 is actively viewing the text message or typing characters at a given rate into the first device 310. The second device 312 may utilize the data received from the first device 310 to determine a driver distraction level. In one aspect, the second device may determine that the driver 330 is heavily distracted and assign a driver distraction level score of 90 out of 100.

In some examples, the second device 312 may determine a driver distraction level by analyzing the phone number associated with the incoming or outgoing call to determine a characteristic of the phone call. For example, the phone number may be associated with a business contact or a personal contact. Further, the tone of the conversation or the length of the conversations may be indicative of the mood of the driver or the focus of the driver. These characteristics and others may be utilized by the second device 312 to determine a driver distraction level. In one aspect, words and phrases that may be used in conversation including the driver 330 may be compared to a database or words and phrases stored on the first device 310, the second device 312, the vehicle 340, or at a remote location accessible by the first device 310 or the second device 312. Words and phrases indicative of a particular emotional state or class of conversation may be detected. Accordingly, detected words and phrases may be correlated with or otherwise used to determine a driver distraction level.

In further embodiments, dash mounted sensors such as driver facing cameras or other like sensors may be used to determine an emotional state of the driver 330. Additionally (or alternatively), health monitoring (e.g., pulse rate monitoring through a steering wheel of the vehicle, a wearable device, or the like) may be used for the determination of a driver distraction level. For example, an increase in the heart rate of the driver 330 during a phone call or another interaction with the first device 310 may be correlated with or otherwise used to calculate a driver distraction level. In one aspect, a combination of detection methods may be used to determine a driver distraction level with improved accuracy as compared with any single method by itself.

In each of the preceding examples, the driver distraction level may be calculated continuously or at regular intervals. In one aspect an instantaneous score may be assigned or a score may be assigned for a given interval of time. In the case of an instantaneous score, a driver distraction level may be calculated based on the current level of interaction between the driver 330 and the first device 310. By comparison, a driver distraction level may be determined based on a fixed or variable time interval. In one aspect, a time interval may be initiated when the driver 330 first interacts with the first device 310. If the interaction between the driver 330 and the first device 310 is terminated (e.g., if the driver 330 toggles off the display of the first device 312) or if the first device 312 becomes idle (e.g., the driver 310 ceases to interact with the first device 312), then the time interval may end or reset. However, if the driver 330 continues to interact with the first device 312, then the interval may continue. In this case, the driver distraction level may be calculated based on the cumulative interactions between the driver 330 and the first device 310 over the course of the time period. In any case, the driver distraction level may vary as a function of time.

Based on the calculated driver distraction level, the second device 312 may further utilize the data related to the driver distraction level in one or more different ways. For example, the driver distraction level may be communicated as a BSM from the V2P enabled second device 312. Accordingly, the vehicles 360 or the pedestrians 370 in the vicinity of the vehicle 340 may be alerted. If the driver distraction level included in the BSM is less than a given value (e.g., 50 in the case of a scale from 1 to 100), then the V2P device 350 associated with the pedestrian 370 or the vehicle 360 may not provide an alert. However, if the driver distraction level included in the BSM is greater than a given value, then an alert may be provided to the user (i.e., a driver of the vehicle 360 or the pedestrian 370) of the V2P device 350. In one aspect, the alert may indicate to the user to generally exercise caution. In another aspect, the alert may indicate the direction from which the vehicle 340 is approaching, the speed at which the vehicle 340 is traveling, a qualitative or quantitative measure of the driver distraction level, the like, or a combination thereof. In one aspect, the user of the V2P device 350 may be able to select the threshold driver distraction level at which an alert is provided to user.

As described herein, the second device 312 may broadcast the driver distraction level to any other device (e.g., device 350) within a communication range that is capable of receiving the broadcast. Further, each device may take the information received from each other device within range and may determine whether the information received is relevant. For example, a V2P device 350 associated with a vehicle 360 or a pedestrian 370 located behind the vehicle 340 (with respect to the direction of travel of the vehicle 340) may determine the relevance of the driver distraction level. In one aspect, the relevance may depend on the geographic location of the V2P device 350 receiving the broadcast, the classification of the associated pedestrian 370 or vehicle 360, or other like factors. Other information broadcast together with the driver distraction level such as the velocity or heading of the vehicle 340, the time of day, or the age or gender of the driver 330 may additionally (or alternatively) be relied upon to determine the relevance of the broadcast.

In some embodiments, the driver distraction level may be relied upon to modify, activate, or deactivate a component of a safety system (not shown) of the vehicle 340. For example, the vehicle 340 may be equipped with a lane tracking system. In response to detecting that the vehicle 340 is drifting out of a current lane of traffic, the lane tracking feature (when active) may automatically correct the heading of the vehicle 340. The lane tracking feature may be activated or enhanced if a driver distraction level exceeds a given threshold driver distraction level. In another aspect, the lane tracking feature may be disabled or deactivated upon detecting that a driver distraction level has diminished or fallen below a given threshold distraction level. In another example, a vehicle safety system may modify the timing or distance for providing a warning related to the proximity of the vehicle 340 to a surrounding vehicle 360 or pedestrian 370. In one aspect, the configuration of the timing or distance may be modified to allow for an increased reaction time if the driver distraction level exceeds a specified threshold value.

In some embodiments, the driver 330 may be alerted to a need to monitor his or her surroundings if the driver distraction level exceeds a specified threshold level. Further, a warning timing or visual interface of the vehicle 340 (if present) may be adjusted to include a more aggressive warning such as a relatively louder audio alert, a more prominent visual alert, or the like. As described above, the driver distraction level may be combined with additional data or information such as the current speed limit, the speed of the vehicle 340, the speed of nearby vehicles 360, or other information received through V2P or V2V communications. The combined information may be used to determine whether the vehicle 340 is moving at the proper speed relative to the speed limit or the surrounding vehicles 360. In one aspect, if a determination is made that the vehicle 340 is moving at an improper speed (e.g., slower than the posted speed limit), then an alert may be provided to the driver 330 to increase the speed of the vehicle 340 or to generally encourage the driver 330 to increase their focus.

Figure 21:
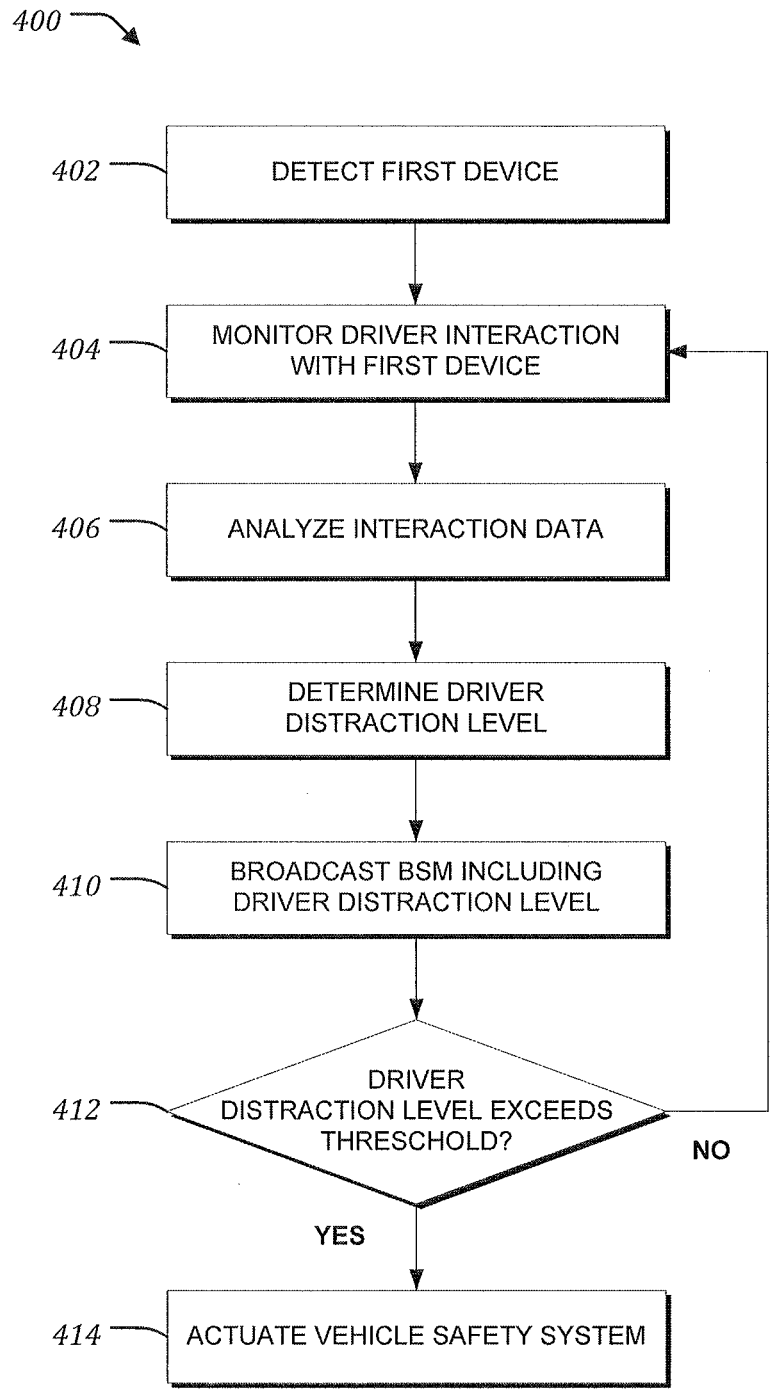
FIG. 21 is a schematic illustration of an example method for the detection and utilization of a driver distraction level.

Turning now to FIG. 21, a first step 402 of an example method 400 for the detection and utilization of a driver distraction level may include detecting a first device. The first device may be a V2P enabled device or another device. In one aspect, the first device may be a smart phone, a basic cell phone, a stereo system of a vehicle, a personal music player, or another electronic device. A step 404 of the method 400 may include monitoring one or more driver interactions with the first device. The driver interaction with the first device may include using the device to send or receive a message, receive an incoming phone call, make an outgoing phone call, enter a destination into a navigation program, or any other like interaction in which the driver otherwise interfaces with the device. In one aspect, the step 404 of monitoring the first device may further include a second device that is capable of receiving interaction data from the first device, analyzing interaction data, broadcasting interaction data or analyzed data, sending or receiving BSMs, or the like. Accordingly, the second device may be a V2P enabled device. Further, the second device may be integral to the vehicle in operation by the driver. Notably, in some embodiments, the step 402 may include detecting two or more devices and the step 404 may include monitoring driver interactions with the two or more devices.

Turning to a step 406 of the method 400, the data generated through the interaction of the driver with the first device may be analyzed, transformed, or otherwise utilized. In one aspect, the interaction data may be analyzed by the first device, the second device, a V2P device associated with a nearby pedestrian or vehicle, or a combination thereof. Analysis of the interaction data may include calculating or estimating a qualitative or quantitative driver distraction level as illustrated in a step 408 of the method 400. Determination of the driver distraction level may be carried out at specific time point or intervals, or for a particular duration of time. In one aspect, the driver distraction level may represent a cumulative set of interaction data over a period of time. In another aspect, the driver distraction level may represent a single interaction of a driver with the first device. In the case that two or more devices are monitored, the step

406 may include analyzing the driver interaction data from the two or more devices. Thereafter, the step 408 may include determining a driver distraction level based on the data analyzed from the two or more devices.

In a step 410 of the method 400, the driver distraction level determined in the step 408, the data generated by the driver interaction with the device, or a combination thereof may be broadcast. In one aspect, the driver distraction level or interaction data may be broadcast as a BSM. The BSM may consist solely of the driver distraction level or the interaction data. Alternatively, the BSM may include information in addition to the driver distraction level or interaction data, such as the current speed of the driver, the heading of the driver, or other like information. The BSM may be transmitted using the first device, the second device, a V2P device, or a combination thereof. The BSM may therefore be received by a surround pedestrian or vehicle equipped with a compatible V2P device.

A step 412 of the method 400 may include determining whether a driver distraction level has exceeded a threshold value. The threshold value may be a set value or a variable value. For example, the threshold may vary as a function of the context of the vehicle or the driver. In one aspect, the threshold may vary based on the time of day, the weather, a classification of a surrounding pedestrian, or the like. If the driver distraction level is determined to exceed the threshold value, the method 400 may continue to a step 414 in which a safety system of the vehicle is actuated. However, if it is determined in the step 412 that the driver distraction level does not exceed a specified threshold value, then the method 400 may return to the step 404, in which the first device may again be monitored.

Referring again to the step 414, actuation of a vehicle safety system may include turning on or modifying a lane tracking feature, providing a relevant alert to the driver of the vehicle, actuating a braking system of the vehicle, or the like. In some embodiments, actuation of a safety system may include communicating or broadcasting an alert to surrounding pedestrians and vehicles equipped with V2P devices. The alert may indicate that the driver of the vehicle broadcasting the BSM is distracted. Therefore, the pedestrians or vehicles may be alerted to use caution. However, information indicating that a driver distraction level has exceeded a specified threshold may additionally or alternatively be broadcast with the BSM in the step 410 of the method 400.

In summary, the present system and method may rely on the detection and utilization of data associated with the interactions of a driver with a device such as a smart phone, a V2P enabled device, or the like. The system and method may rely directly on data associated with usage of the device to provide a reliable approach for the determination of a driver distraction levels. Accordingly, the system and method may omit sensors such as cameras or pause sensors for detecting a driver distraction level. However, it will be appreciated that a system and method for the detection and utilization of driver distraction level may be combined with one or more additional sensors, detectors, or other systems.

The preceding examples of a driver interaction with a device are presented for illustrative purposes only and are not intended to be limiting to the system and method of the present disclosure. In one aspect, it is anticipated that there may be many possible interactions between a driver and one or more devices depending on the device and the driver. Further, there may be many combinations and permutations of interactions. Therefore, the method by which the data is utilized for determining a driver distraction level may be varied without departing from the scope of the present disclosure.

The schematic flow charts shown in the figures are generally set forth as logical flow chart diagrams. As such, the depicted order and labeled steps are indicative of one embodiment of the presented methods. Other steps and methods may be conceived that are equivalent in function, logic, or effect to one or more steps, or portions thereof, of the illustrated methods. Additionally, the format and symbols employed in the figures are provided to explain the logical steps of the method and are understood not to limit the scope of the methods. Although various arrow types and line types may be employed, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

Each reference identified in the present application is herein incorporated by reference in its entirety.

What is claimed is:

1. A system, comprising:
   a primary vehicle operable by a driver, the driver being associated with a first device having a plurality of features with which the driver may interact;
   at least one range-sensitive antenna installed in a steering wheel of the primary vehicle for measuring a distance between the steering wheel and the first device; and
   a second device integral with the primary vehicle and in communication with the first device and the at least one range-sensitive antenna, the second device being configured to:
   detect an interaction between the driver and at least one of the plurality of features of the first device,
   detect a load on a steering column of the primary vehicle, and
   calculate a driver distraction level based at least upon: the interaction between the driver and the at least one of the plurality of features of the first device, the distance between the steering wheel and the first device, and the detected load.

2. The system of claim 1, wherein the second device is further configured to broadcast the driver distraction level.

3. The system of claim 2, wherein the driver distraction level is broadcast as a component of a basic safety message (BSM).

4. The system of claim 2, wherein the broadcast is receivable by a vehicle to pedestrian (V2P) communication device associated with at least one of a secondary vehicle and a pedestrian.

5. The system of claim 1, wherein the second device is a vehicle to pedestrian (V2P) communication device.

6. The system of claim 1, further comprising a vehicle safety system, the vehicle safety system being actuated in response to the driver distraction level exceeding a threshold level.

7. The system of claim 6, wherein the vehicle safety system comprises at least one of a lane tracking system, a human machine interface (HMI), a braking system, an audible alert system, and a visual alert system.

8. The system of claim 1, further comprising a proximity sensor mounted to the primary vehicle, the proximity sensor being configured to detect the location of the first device relative to the driver.

9. The system of claim 1, further comprising a heart rate monitor for determining a heart rate of the driver, wherein the driver distraction level is further based upon the heart rate of the driver.

10. The system of claim 1, further comprising a driver facing camera for detecting an emotional state of the driver, wherein the driver distraction level is further based upon the emotional state of the driver.

11. A method, comprising:
    detecting a first device, the first device having a plurality of features with which a driver of a primary vehicle may interact;
    measuring a distance between a steering wheel of the primary vehicle and the first device via at least one range-sensitive antenna installed in the steering wheel;
    monitoring with a second device an interaction between the driver and at least one of the plurality of features of the first device;
    detecting a load on a steering column of the primary vehicle; and
    calculating a driver distraction level based at least upon: the interaction between the driver and the at least one of the plurality of features of the first device, the distance between the steering wheel and the first device, and the detected load.

12. The method of claim 11, further comprising broadcasting the driver distraction level.

13. The method of claim 12, wherein the driver distraction level is broadcast as a component of a basic safety message (BSM).

14. The method of claim 12, wherein the broadcast is receivable by a vehicle to pedestrian (V2P) communication device associated with at least one of a secondary vehicle and a pedestrian.

15. The method of claim 11, wherein the second device is a vehicle to pedestrian (V2P) communication device.

16. The method of claim 11, further comprising:
    comparing the driver distraction level with a threshold level; and
    actuating a vehicle safety system in response to the driver distraction level exceeding the threshold level.

17. The method of claim 16, wherein the vehicle safety system comprises at least one of a lane tracking system, a human machine interface (HMI), a braking system, an audible alert system, and a visual alert system.

18. The method of claim 11, further comprising determining with a proximity sensor mounted to the primary vehicle the location of the first device relative to the driver.

19. The method of claim 11, further comprising measuring with a heart rate monitor the heart rate of the driver, wherein the step of calculating the driver distraction level is further based upon the heart rate of the driver.

20. The method of claim 11, further comprising detecting with a driver facing camera an emotional state of the driver, wherein the step of calculating the driver distraction level is further based upon the emotional state of the driver.

* * * * *

UNITED STATES PATENT AND TRADEMARK OFFICE
CERTIFICATE OF CORRECTION

PATENT NO. : 9,505,412 B2  
APPLICATION NO. : 14/566562  
DATED : November 29, 2016  
INVENTOR(S) : Xue Bai et al.

Page 1 of 1

It is certified that error appears in the above-identified patent and that said Letters Patent is hereby corrected as shown below:

On the Title Page

(72) Inventors should read: Xue Bai, Novi, MI (US); Radovan Miucic, Southfield, MI (US)

Signed and Sealed this  
Twenty-fifth Day of September, 2018

Andrei Iancu  
*Director of the United States Patent and Trademark Office*